(12) United States Patent
Newman, Jr.

(10) Patent No.: US 8,698,408 B2
(45) Date of Patent: Apr. 15, 2014

(54) TWO-WIRE DIMMER SWITCH FOR LOW-POWER LOADS

(75) Inventor: Robert C. Newman, Jr., Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 68 days.

(21) Appl. No.: 13/232,344

(22) Filed: Sep. 14, 2011

(65) Prior Publication Data

US 2012/0033471 A1 Feb. 9, 2012

Related U.S. Application Data

(63) Continuation-in-part of application No. 12/952,920, filed on Nov. 23, 2010.

(60) Provisional application No. 61/264,528, filed on Nov. 25, 2009, provisional application No. 61/333,050, filed on May 10, 2010.

(51) Int. Cl.
*H05B 37/02* (2006.01)

(52) U.S. Cl.
USPC .......................... 315/194; 315/199; 315/291

(58) Field of Classification Search
USPC ......... 315/194, 199, 291, 294, 297, 307, 311, 315/318
See application file for complete search history.

(56) References Cited

U.S. PATENT DOCUMENTS

| | | | |
|---|---|---|---|
| 3,333,204 A | | 7/1967 | Schonholzer |
| 3,731,182 A | * | 5/1973 | Hirono et al. ................. 323/325 |
| 3,763,396 A | * | 10/1973 | Shilling ........................ 315/307 |
| 4,870,340 A | | 9/1989 | Kral |
| 4,876,498 A | | 10/1989 | Luchaco et al. |
| 4,954,768 A | * | 9/1990 | Luchaco et al. .............. 323/300 |
| 5,004,969 A | | 4/1991 | Schanin |

(Continued)

FOREIGN PATENT DOCUMENTS

| | | |
|---|---|---|
| EP | 0674390 | 3/1994 |
| EP | 2 020 830 | 2/2009 |

(Continued)

OTHER PUBLICATIONS

Written Opinion dated Jan. 23, 2012 issued in corresponding PCT International Application No. PCT/US2010/057949.

(Continued)

*Primary Examiner* — Tung X Le
(74) *Attorney, Agent, or Firm* — Ostrolenk Faber LLP

(57) ABSTRACT

A two-wire load control device (such as, a dimmer switch) for controlling the amount of power delivered from an AC power source to an electrical load (such as, a high-efficiency lighting load) includes a thyristor coupled between the source and the load, a gate coupling circuit coupled between a first main load terminal and the gate of the thyristor, and a control circuit coupled to a control input of the gate coupling circuit. The control circuit generates a drive voltage for causing the gate coupling circuit to conduct a gate current to thus render the thyristor conductive at a firing time during a half cycle of the AC power source, and to allow the gate coupling circuit to conduct the gate current at any time from the firing time through approximately the remainder of the half cycle, where the gate coupling circuit conducts approximately no net average current to render and maintain the thyristor conductive.

32 Claims, 21 Drawing Sheets

(56) References Cited

U.S. PATENT DOCUMENTS

| | | | |
|---|---|---|---|
| 5,038,081 | A | 8/1991 | Maiale, Jr. et al. |
| 5,237,244 | A | 8/1993 | Bertenshaw et al. |
| 5,239,255 | A | 8/1993 | Schanin et al. |
| 5,319,301 | A | 6/1994 | Callahan et al. |
| 5,491,402 | A | 2/1996 | Small |
| 5,629,607 | A | 5/1997 | Callahan et al. |
| 5,672,941 | A | 9/1997 | Callahan et al. |
| 5,821,703 | A | 10/1998 | Callahan et al. |
| 5,861,720 | A | 1/1999 | Johnson |
| 5,861,721 | A | 1/1999 | Johnson |
| 6,021,055 | A | 2/2000 | Parry |
| 6,294,901 | B1 * | 9/2001 | Peron .......................... 323/239 |
| 6,700,333 | B1 * | 3/2004 | Hirshi et al. .................. 315/291 |
| 6,933,686 | B1 * | 8/2005 | Bishel ........................... 315/293 |
| 6,975,078 | B2 * | 12/2005 | Yanai et al. ................... 315/291 |
| 7,119,497 | B2 | 10/2006 | Gonthier et al. |
| 7,190,124 | B2 | 3/2007 | Kumar et al. |
| 7,339,331 | B2 | 3/2008 | Vanderzon |
| 7,480,128 | B2 | 1/2009 | Black |
| 7,570,031 | B2 | 8/2009 | Salvestrini |
| 7,619,365 | B2 | 11/2009 | Davis et al. |
| 7,868,561 | B2 | 1/2011 | Weightman et al. |
| 8,018,172 | B2 * | 9/2011 | Leshniak ...................... 315/194 |
| 8,198,820 | B2 | 6/2012 | Weightman et al. |
| 8,242,714 | B2 | 8/2012 | Weightman et al. |
| 2004/0183474 | A1 | 9/2004 | Moisin |
| 2005/0168200 | A1 | 8/2005 | Vanderzon |
| 2005/0168896 | A1 | 8/2005 | Vanderzon |
| 2005/0174070 | A1 | 8/2005 | Vanderzon |
| 2005/0189929 | A1 | 9/2005 | Schulz |
| 2005/0257354 | A1 | 11/2005 | Kawai et al. |
| 2006/0109702 | A1 | 5/2006 | Weightman |
| 2006/0255745 | A1 | 11/2006 | DeJonge et al. |
| 2007/0001654 | A1 | 1/2007 | Newman, Jr. |
| 2007/0182347 | A1 | 8/2007 | Shteynberg et al. |
| 2007/0217237 | A1 | 9/2007 | Salvestrini |
| 2008/0029108 | A1 | 2/2008 | Catron et al. |
| 2008/0224624 | A1 * | 9/2008 | Richter ......................... 315/194 |
| 2009/0108765 | A1 | 4/2009 | Weightman et al. |
| 2009/0160627 | A1 * | 6/2009 | Godbole .................. 340/310.11 |
| 2009/0200952 | A1 | 8/2009 | King |
| 2010/0259196 | A1 * | 10/2010 | Sadwick et al. .............. 315/309 |
| 2010/0270982 | A1 | 10/2010 | Hausman, Jr. et al. |
| 2011/0121752 | A1 | 5/2011 | Newman, Jr. |
| 2011/0121812 | A1 | 5/2011 | Salvestrini |
| 2012/0230073 | A1 | 9/2012 | Newman, Jr. et al. |
| 2013/0170263 | A1 | 7/2013 | Newman, Jr. et al. |

FOREIGN PATENT DOCUMENTS

| | | |
|---|---|---|
| FR | 2859580 | 3/2005 |
| GB | 2155256 | 9/1985 |
| WO | WO 99/20082 | 4/1999 |
| WO | WO-2005/115058 | 12/2005 |

OTHER PUBLICATIONS

International Preliminary Report on Patentability dated Mar. 2, 2012 issued in corresponding PCT International Application No. PCT/US10/57949.

International Search Report and Written Opinion dated Mar. 3, 2011 in corresponding International Application No. PCT/US2010/057949.

International Preliminary Report on Patentability dated Mar. 6, 2012 issued in corresponding PCT International Application No. PCT/US10/57382.

International Search Report and Written Opinion dated Dec. 5, 2012 in corresponding International Application No. PCT/US2012/055024.

Description of Lutron Rania Dimmer Switch, pp. 1-3, Figures 1 and 2, dimmer switch available to the public as early as 2007.

International Preliminary Report on Patentability dated Mar. 22, 2012 issued in corresponding PCT International Application No. PCT/US10/57953.

International Search Report and Written Opinion dated Jun. 22, 2011 issued in corresponding PCT International Application No. PCT/US10/57953.

* cited by examiner

TWO-WIRE DIMMER SWITCH FOR LOW-POWER LOADS

This is a continuation-in-part of commonly-assigned U.S. patent application No. 12/952,920, filed Nov. 23, 2010, entitled TWO-WIRE DIMMER SWITCH FOR LOW-POWER LOADS, which claims priority from U.S. Provisional Patent Application No. 61/264,528, filed Nov. 25, 2009, and U.S. Provisional Patent Application No. 61/333,050, filed May 10, 2010, both entitled TWO-WIRE ANALOG DIMMER SWITCH FOR LOW-POWER LOADS, the entire disclosures of which are hereby incorporated by reference.

BACKGROUND OF THE INVENTION

1. Field of the Invention

The present invention relates to load control devices for controlling the amount of power delivered to an electrical load, and more particularly, to a two-wire analog dimmer switch for controlling the intensity of a low-power lighting load, such as a light-emitting diode (LED) light source having an LED driver circuit or a fluorescent lamp having an electronic dimming ballast.

2. Description of the Related Art

Prior art two-wire dimmer switches are coupled in series electrical connection between an alternating-current (AC) power source and a lighting load for controlling the amount of power delivered from the AC power source to the lighting load. A two-wire wall-mounted dimmer switch is adapted to be mounted to a standard electrical wallbox and comprises two load terminals: a hot terminal adapted to be coupled to the hot side of the AC power source and a dimmed hot terminal adapted to be coupled to the lighting load. In other words, the two-wire dimmer switch does not require a connection to the neutral side of the AC power source (i.e., the load control device is a "two-wire" device). Prior art "three-way" dimmer switches may be used in three-way lighting systems and comprise at least three load terminals, but do not require a connection to the neutral side of the AC power source.

The dimmer switch typically comprises a bidirectional semiconductor switch, e.g., a thryristor (such as a triac) or two field-effect transistors (FETs) in anti-series connection. The bidirectional semiconductor switch is coupled in series between the AC power source and the load and is controlled to be conductive and non-conductive for portions of a half cycle of the AC power source to thus control the amount of power delivered to the electrical load. Generally, dimmer switches use either a forward phase-control dimming technique or a reverse phase-control dimming technique in order to control when the bidirectional semiconductor switch is rendered conductive and non-conductive to thus control the power delivered to the load. The dimmer switch may comprise a toggle actuator for turning the lighting load on and off and an intensity adjustment actuator for adjusting the intensity of the lighting load. Examples of prior art dimmer switches are described in greater detail is commonly-assigned U.S. Pat. No. 5,248,919, issued Sep. 29, 1993, entitled LIGHTING CONTROL DEVICE; U.S. Pat. No. 6,969,959, issued Nov. 29, 2005, entitled ELECTRONIC CONTROL SYSTEMS AND METHODS; and U.S. Pat. No. 7,687,940, issued Mar. 30, 2010, entitled DIMMER SWITCH FOR USE WITH LIGHTING CIRCUITS HAVING THREE-WAY SWITCHES, the entire disclosures of which are hereby incorporated by reference.

With forward phase-control dimming, the bidirectional semiconductor switch is rendered conductive at some point within each AC line voltage half cycle and remains conductive until approximately the next voltage zero-crossing, such that the bidirectional semiconductor switch is conductive for a conduction time each half cycle. A zero-crossing is defined as the time at which the AC line voltage transitions from positive to negative polarity, or from negative to positive polarity, at the beginning of each half cycle. Forward phase-control dimming is often used to control energy delivered to a resistive or inductive load, which may include, for example, an incandescent lamp or a magnetic low-voltage transformer. The bidirectional semiconductor switch of a forward phase-control dimmer switch is typically implemented as a thyristor, such as a triac or two silicon-controlled rectifiers (SCRs) coupled in anti-parallel connection, since a thyristor becomes non-conductive when the magnitude of the current conducted through the thyristor decreases to approximately zero amps.

Many forward phase-control dimmers include analog control circuits (such as timing circuits) for controlling when the thyristor is rendered conductive each half cycle of the AC power source. The analog control circuit typically comprises a potentiometer, which may be adjusted in response to a user input provided from, for example, a linear slider control or a rotary knob in order to control the amount of power delivered to the lighting load. The analog control circuit is typically coupled in parallel with the thyristor and conducts a small timing current through the lighting load when the thyristor is non-conductive. The magnitude of the timing current is small enough such that the controlled lighting load is not illuminated to a level that is perceptible to the human eye when the lighting load is off.

Thyristors are typically characterized by a rated latching current and a rated holding current, and comprise two main load terminals and a control terminal (i.e., a gate). The current conducted through the main terminals of the thyristor must exceed the latching current for the thyristor to become fully conductive. In addition, the current conducted through the main terminals of the thyristor must remain above the holding current for the thyristor to remain in full conduction. Since an incandescent lamp is a resistive lighting load, a typical forward phase-control dimmer switch is operable to conduct enough current through the incandescent lamp to exceed the rated latching and holding currents of the thyristor if the impedance of the incandescent lamp is low enough. Therefore, prior art forward phase-control dimmer switches are typically rated to operate appropriately with lighting loads having a power rating above a minimum power rating (e.g., approximately 40 W) to guarantee that the thyristor will be able to latch and remained latched when dimming the lighting load.

Some prior art dimmer switches have included two triacs coupled together to overcome some of the problems related to the rated latching and holding currents of triacs as described in greater detail in commonly-assigned U.S. Pat. No. 4,954,768, issued Sep. 4, 1990, entitled TWO WIRE LOW VOLTAGE DIMMER. Such a prior art dimmer switch may comprise a first triac characterized by a low power rating and low latching and holding currents, and a second triac characterized by a high power rating and high latching and holding currents. The main load terminals of the first triac are coupled between one of the main load terminals and the gate of the second triac. In addition, a resistor is coupled between the other main load terminal and the gate of the second triac. If the magnitude of the load current is small, the first triac is rendered conductive when a pulse of current is conducted through the gate and remains latched until the magnitude of the load current drops below the holding current of the first triac (e.g., at the end of a half cycle). If the magnitude of the load current is large, the first triac conducts a pulse of the gate current through the gate of the second triac to render the second triac conductive and the second triac conducts the load current. Since the voltage across the first triac drops to approximately zero volts when the second triac is conductive, the first triac becomes non-conductive after the second triac is rendered conductive. The second triac remains conductive until the magnitude of the load current drops below the holding current of the second triac (e.g., at the end of a half cycle).

When using reverse phase-control dimming, the bidirectional semiconductor switch is rendered conductive at the zero-crossing of the AC line voltage and rendered non-conductive at some point within each half cycle of the AC line voltage, such that the bidirectional semiconductor switch is conductive for a conduction time each half cycle. Reverse phase-control dimming is often used to control energy to a capacitive load, which may include, for example, an electronic low-voltage transformer. Since the bidirectional semiconductor switch must be rendered conductive at the beginning of the half cycle, and must be able to be rendered non-conductive within the half cycle, reverse phase-control dimming requires that the dimmer switch have two FETs in anti-serial connection, or the like. A FET is operable to be rendered conductive and to remain conductive independent of the magnitude of the current conducted through the FET. In other words, a FET is not limited by a rated latching or holding current as is a thyristor. However, prior art reverse phase-control dimmer switches have either required neutral connections and/or advanced control circuits (such as microprocessors) for controlling the operation of the FETs. In order to power a microprocessor, the dimmer switch must also comprise a power supply, which is typically coupled in parallel with the FETs. These advanced control circuits and power supplies add to the cost of prior art FET-based reverse phase-control dimmer switches (as compared to analog forward phase-control dimmer switches).

Further, in order to properly charge, the power supply of such a two-wire dimmer switch must develop an amount of voltage across the power supply and must conduct a charging current from the AC power source through the electrical load, in many instances even when the lighting load is off. If the power rating of the lighting load is too low, the charging current conducted by the power supply through the lighting load may be great enough to cause the lighting load to illuminate to a level that is perceptible to the human eye when the lighting load is off. Therefore, prior art FET-based reverse phase-control dimmer switches are typically rated to operate appropriately with lighting loads having a power rating above a minimum power rating to guarantee that the lighting load does not illuminate to a level that is perceptible to the human eye due to the power supply current when the lighting load is off. Some prior art load control devices, have included power supplies that only develop small voltages and draw small currents when charging, such that the minimum power rating of a controlling lighting load may be as low as 10 W. An example of such a power supply is described in greater detail in commonly-assigned U.S. patent application Ser. No. 12/751,324, filed Mar. 31, 2010, entitled SMART ELECTRONIC SWITCH FOR LOW-POWER LOADS, the entire disclosure of which is hereby incorporated by reference.

Nevertheless, it is desirable to be able to control the amount of power to electrical loads having power rating lower than those able to be controlled by the prior art forward and reverse phase-control dimmer switches. In order to save energy, high-efficiency lighting loads, such as, for example, compact fluorescent lamps (CFLs) and light-emitting diode (LED) light sources, are being used in place of or as replacements for conventional incandescent or halogen lamps. High-efficiency light sources typically consume less power and provide longer operational lives as compared to incandescent and halogen lamps. In order to illuminate properly, a load regulation device (e.g., such as an electronic dimming ballast or an LED driver) must be coupled between the AC power source and the respective high-efficiency light source (i.e., the compact fluorescent lamp or the LED light source) for regulating the power supplied to the high-efficiency light source.

A dimmer switch controlling a high-efficiency light source may be coupled in series between the AC power source and the load control device for the high-efficiency light source. Some high-efficiency lighting loads are integrally housed with the load regulation devices in a single enclosure. Such an enclosure may have a screw-in base that allows for mechanical attachment to standard Edison sockets and provide electrical connections to the neutral side of the AC power source and either the hot side of the AC power source or the dimmed-hot terminal of the dimmer switch (e.g., for receipt of the phase-control voltage). The load regulation circuit is operable to control the intensity of the high-efficiency light source to the desired intensity in response to the conduction time of the bidirectional semiconductor switch of the dimmer switch.

However, the load regulation devices for the high-efficiency light sources may have high input impedances or input impedances that vary in magnitude throughout a half cycle. Therefore, when a prior-art forward phase-control dimmer switch is coupled between the AC power source and the load regulation device for the high-efficiency light source, the load control device may not be able to conduct enough current to exceed the rated latching and/or holding currents of the thyristor. In addition, when a prior-art reverse phase-control dimmer switch is coupled between the AC power source and the load regulation device, the magnitude of the charging current of the power supply may be great enough to cause the load regulation device to illuminate the controlled high-efficiency light source to a level that is perceptible by the human eye when the light source should be off.

The impedance characteristics of the load regulation device may negatively affect the magnitude of the phase-control voltage received by the load regulation device, such that the conduction time of the received phase-control voltage is different from the actually conduction time of the bidirectional semiconductor switch of the dimmer switch (e.g., if the load regulation device has a capacitive impedance). Therefore, the load regulation device may control the intensity of the high-efficiency light source to an intensity that is different than the desired intensity as directed by the dimmer switch. In addition, the charging current of the power supply of the dimmer switch may build up charge at the input of a load regulation device having a capacitive input impedance, thus negatively affecting the low-end intensity that may be achieved.

Therefore, there exists a need for a two-wire load control device that may be coupled between an AC power source and a load regulation device for a high-efficiency light source and is able to properly control the intensity of the high-efficiency light source.

SUMMARY OF THE INVENTION

According to an embodiment of the present invention, a load control device for controlling the amount of power delivered from an AC power source to an electrical load comprises a thyristor, a gate coupling circuit, and a control circuit. The thyristor has first and second main load terminals adapted to be coupled in series electrical connection between the AC power source and the electrical load for conducting a load current from the AC power source to the electrical load, and a gate for conducting a gate current to render the thyristor conductive. The gate coupling circuit is coupled between the first main load terminal and the gate of thyristor, and comprises a control input for receiving a drive voltage. The gate coupling circuit conducts the gate current through the gate of the thyristor in response to the drive voltage. The control circuit is coupled to at least one of the main load terminals of the thyristor and to the control input of the gate coupling circuit, and is operable to generate the drive voltage. The control circuit operable to control the drive voltage to cause the gate coupling circuit to conduct the gate current to thus render the thyristor conductive at a firing time during a half cycle of the AC power source, the control circuit operable to control the drive voltage to allow the gate coupling circuit to conduct the gate current at any time from the firing time through approximately the remainder of the half cycle. The gate coupling circuit conducts approximately no net average current through the control input in order to remain conductive and to thus be able to conduct the gate current at any time from the firing time through approximately the remainder of the half cycle.

The gate coupling circuit may comprise two MOS-gated transistors that are coupled in anti-series connection between the first main load terminal and the gate of thyristor and are rendered conductive to conduct the gate current through the gate of the thyristor in response to the drive voltage. The control circuit controls the drive voltage to cause the MOS-gated transistors to conduct the gate current to thus render the thyristor conductive at the firing time during a half cycle of the AC power source and to prevent the MOS-gated transistors from conducting the gate current and allow the thyristor to become non-conductive at a second time after the firing time and before the end of the half cycle, such that the MOS-gated transistors are able to conduct the gate current and the thyristor is rendered conductive at any time between the firing time and the second time. The gate coupling circuit conducts an average current of less than one microamp through the control input in order to maintain the MOS-gated transistors conductive, such that the MOS-gated transistors are able to conduct the gate current at any time between the firing time and the second time.

According to another embodiment of the present invention, a load control circuit for controlling the amount of power delivered from an AC power source to an electrical load to a desired amount of power comprises a thyristor having first and second main load terminals and a gate, and a gate coupling circuit coupled between a first one of the main terminals and the gate of thyristor. The main load terminals of the thyristor are adapted to be coupled in series electrical connection between the AC power source and the electrical load for conducting a load current from the AC power source to the electrical load. The gate of the thyristor conducts a gate current to render the thyristor conductive. The gate coupling circuit comprises a control input for receiving a drive voltage, and two MOS-gated transistors (e.g., MOSFETs or IGBTs) coupled in anti-series connection between the first main load terminal and the gate of thyristor. Each of the two MOS-gated transistors is rendered conductive when a voltage at a gate of the MOS-gated transistor exceeds a gate threshold voltage. The MOS-gated transistors are rendered conductive to conduct the gate current through the gate of the thyristor when the magnitude of the drive voltage is driven above approximately the gate threshold voltage at a firing time during a half cycle of the AC power source, and to continue to conduct the gate current while the magnitude of the drive voltage is maintained above approximately the gate threshold voltage for approximately the remainder of the half cycle. The gate coupling circuit conducts approximately no net average current through the control input in order to maintain the MOS-gated transistors conductive and to thus be able to conduct the gate current at any time while the magnitude of the drive voltage is maintained above approximately the gate threshold voltage.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
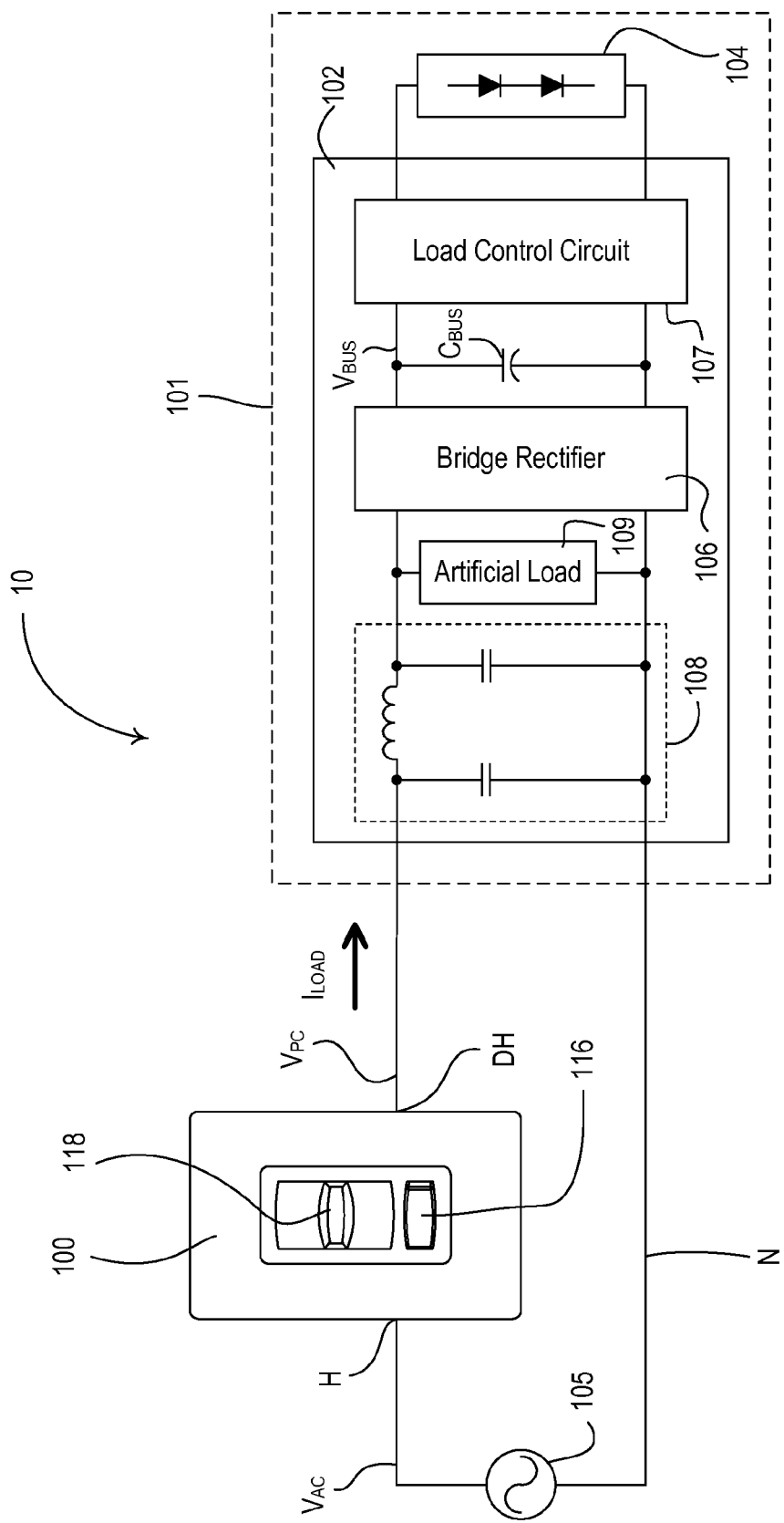
FIG. 1 is a simplified block diagram of a lighting control system including a two-wire analog dimmer switch for controlling the intensity of an LED light source according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 10 including a "two-wire" dimmer switch 100 for controlling the amount of power delivered to a high-efficiency lighting load 101 including a load regulation device, e.g., a light-emitting diode (LED) driver 102, and a high-efficiency light source, e.g., an LED light source 104 (or "light engine"). The dimmer switch 100 has a hot terminal H coupled to an alternating-current (AC) power source 105 for receiving an AC mains line voltage $V_{AC}$, and a dimmed-hot terminal DH coupled to the LED driver 102. The dimmer switch 100 does not require a direct connection to the neutral side N of the AC power source 105. The dimmer switch 100 generates a phase-control voltage $V_{PC}$ (e.g., a dimmed-hot voltage) at the dimmed-hot terminal DH and conducts a load current $I_{LOAD}$ through the LED driver 102. The dimmer switch 100 may either use forward phase-control dimming or reverse phase-control dimming techniques to generate the phase-control voltage $V_{PC}$.

As defined herein, a "two-wire" dimmer switch or load control device does not require a require a direct connection to the neutral side N of the AC power source 105. In other words, all currents conducted by the two-wire dimmer switch must also be conducted through the load. A two-wire dimmer switch may have only two terminals (i.e., the hot terminal H and the dimmed hot terminal DH as shown in FIG. 1). Alternatively, a two-wire dimmer switch (as defined herein) could comprise a three-way dimmer switch that may be used in a three-way lighting system and has at least three load terminals, but does not require a neutral connection. In addition, a two-wire dimmer switch may comprise an additional connection that provides for communication with a remote control device (for remotely controlling the dimmer switch), but does not require the dimmer switch to be directly connected to neutral.

The LED driver 102 and the LED light source 104 may be both included together in a single enclosure, for example, having a screw-in base adapted to be coupled to a standard Edison socket. When the LED driver 102 is included with the LED light source 104 in the single enclosure, the LED driver only has two electrical connections: to the dimmer switch 100 for receiving the phase-control voltage $V_{PC}$ and to the neutral side N of the AC power source 105. The LED driver 102 comprises a rectifier bridge circuit 106 that receives the phase-control voltage $V_{PC}$ and generates a bus voltage $V_{BUS}$ across a bus capacitor $C_{BUS}$. The LED driver 102 further comprises a load control circuit 107 that receives the bus voltage $V_{BUS}$ and controls the intensity of the LED light source 104 in response to the phase-control signal $V_{PC}$. Specifically, the load control circuit 107 of the LED driver 102 is operable to turn the LED light source 104 on and off and to adjust the intensity of the LED light source to a target intensity $L_{TRGT}$ (i.e., a desired intensity) in response to the phase-control signal $V_{PC}$. The target intensity $L_{TRGT}$ may range between a low-end intensity $L_{LE}$ (e.g., approximately 1%) and a high-end intensity $L_{HE}$ (e.g., approximately 100%). The LED driver 102 may also comprise a filter network 108 for preventing noise generated by the load control circuit 107 from being conducted on the AC mains wiring. Since the LED driver 102 comprises the bus capacitor $C_{BUS}$ and the filter network 108, the LED driver may have a capacitive input impedance. An example of the LED driver 102 is described in greater detail in U.S. patent application Ser. No. 12/813,908, filed Jun. 11, 2009, entitled LOAD CONTROL DEVICE FOR A LIGHT-EMITTING DIODE LIGHT SOURCE, the entire disclosure of which is hereby incorporated by reference.

In addition, the LED driver 102 may comprise an artificial load circuit 109 for conducting current (in addition to the load current $I_{LOAD}$) through the dimmer switch 100. Accordingly, if the dimmer switch 100 includes a triac for generating the phase-control voltage $V_{PC}$, the artificial load circuit 109 may conduct enough current to ensure that the magnitude of the total current conducted through the triac of the dimmer switch 100 exceeds the rated latching and holding currents of the triac. In addition, the artificial load circuit 109 may conduct a timing current if the dimmer switch 100 comprises a timing circuit and may conduct a charging current if the dimmer switch comprises a power supply, such that these currents need not be conducted through the load control circuit 107 and do not affect the intensity of the LED light source 104.

The artificial load circuit 109 may simply comprise a constant impedance circuit (e.g., a resistor) or may comprise a current source circuit. Alternatively, the artificial load circuit 109 may be controllable, such that the artificial load circuit may be enabled and disabled to thus selectively conduct current through the dimmer switch 100. In addition, the artificial load circuit 109 may be controlled to conduct different amounts of current depending upon the magnitude of the AC mains line voltage $V_{AC}$, the present time during a half cycle of the AC mains line voltage, or the present operating mode of the LED driver 102. Examples of artificial load circuits are described in greater detail in commonly-assigned U.S. patent application Ser. No. 12/438,587, filed Aug. 5, 2009, entitled VARIABLE LOAD CIRCUITS FOR USE WITH LIGHTING CONTROL DEVICES, and U.S. patent application Ser. No. 12/950,079, filed Nov. 19, 2010, entitled CONTROLLABLE-LOAD CIRCUIT FOR USE WITH A LOAD CONTROL DEVICE, the entire disclosures of which are hereby incorporated by reference.

Alternatively, the high-efficiency light source could comprise a compact fluorescent lamp (CFL) and the load regulation device could comprise an electronic dimming ballast. In addition, the dimmer switch 100 could alternatively control the amount of power delivered to other types of electrical loads, for example, by directly controlling a lighting load or a motor load. An example of a screw-in light source having a fluorescent lamp and an electronic dimming ballast is described in greater detail in U.S. patent application Ser. No.

12/704,781, filed Feb. 12, 2010, entitled HYBRID LIGHT SOURCE, the entire disclosure of which is hereby incorporated by reference.

The dimmer switch 100 comprises a user interface having a rocker switch 116 and an intensity adjustment actuator 118 (e.g., a slider knob as shown in FIG. 1). The rocker switch 116 allows for turning on and off the LED light source 104, while the intensity adjustment actuator 118 allows for adjustment of the target intensity $L_{TRGT}$ of the LED light source 104 from the low-end intensity $L_{LE}$ to the high-end intensity $L_{HE}$. Examples of user interfaces of dimmer switches are described in greater detail in commonly-assigned U.S. patent application Ser. No. 12/363,258, filed Jan. 30, 2009, entitled LOAD CONTROL DEVICE HAVING A VISUAL INDICATION OF ENERGY SAVINGS AND USAGE INFORMATION, the entire disclosure of which is hereby incorporated by reference.

Figure 2:
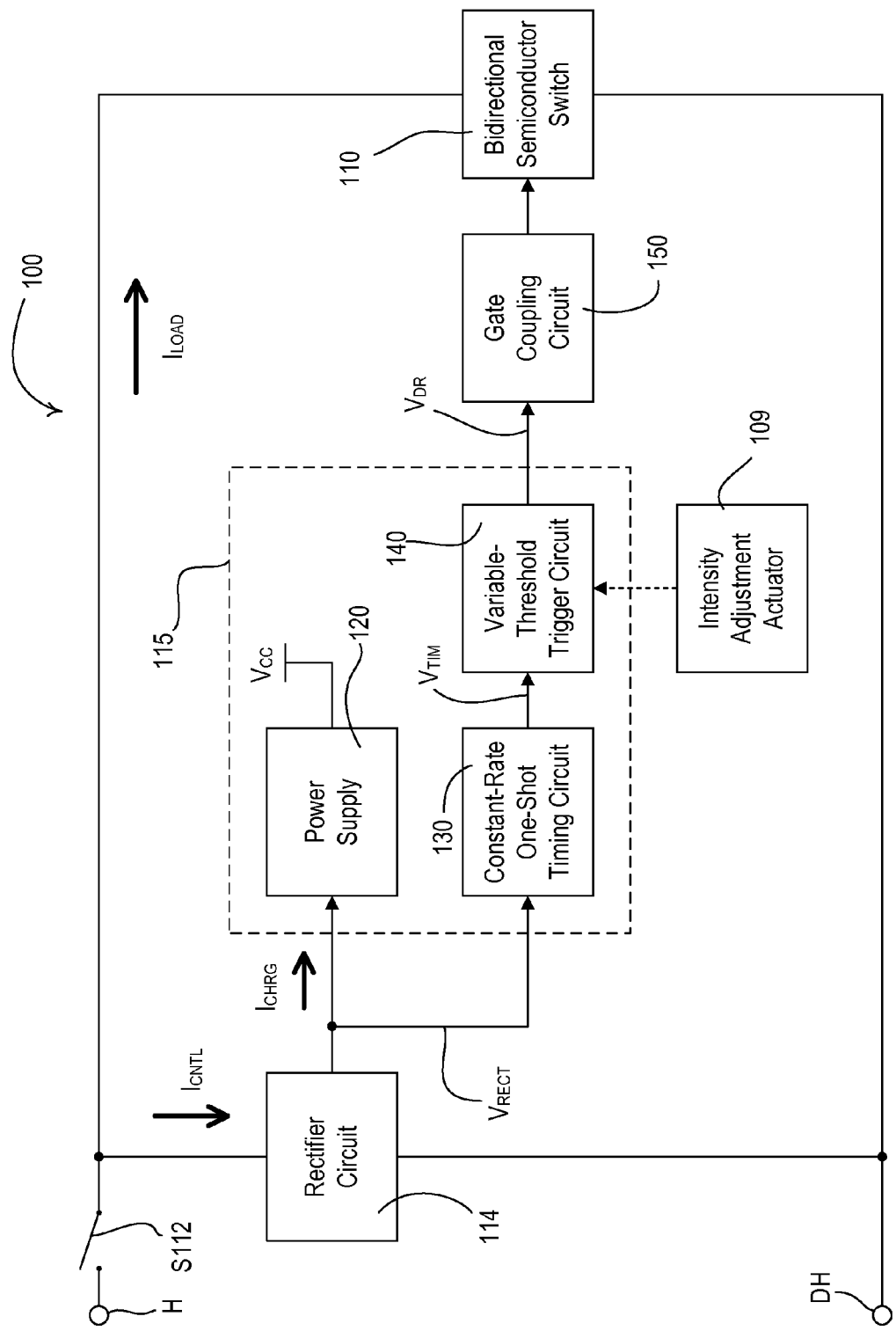
FIG. 2 is a simplified block diagram of the dimmer switch of FIG. 1 according to the first embodiment of the present invention.
Figure 3A:
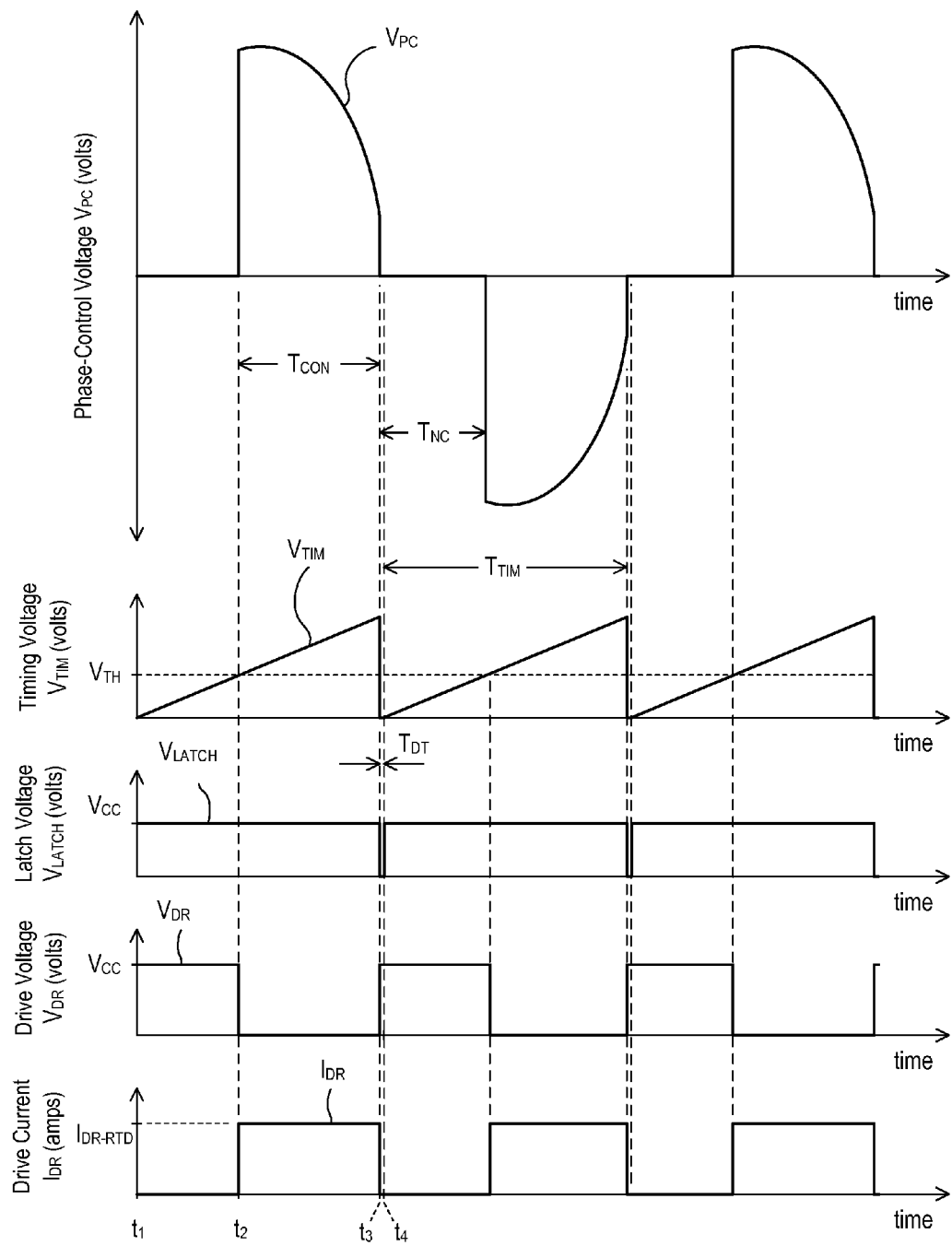
FIGS. 3A and 3B show example waveforms illustrating the operation of the dimmer switch of FIG. 1 according to the first embodiment of the present invention.
Figure 3B:
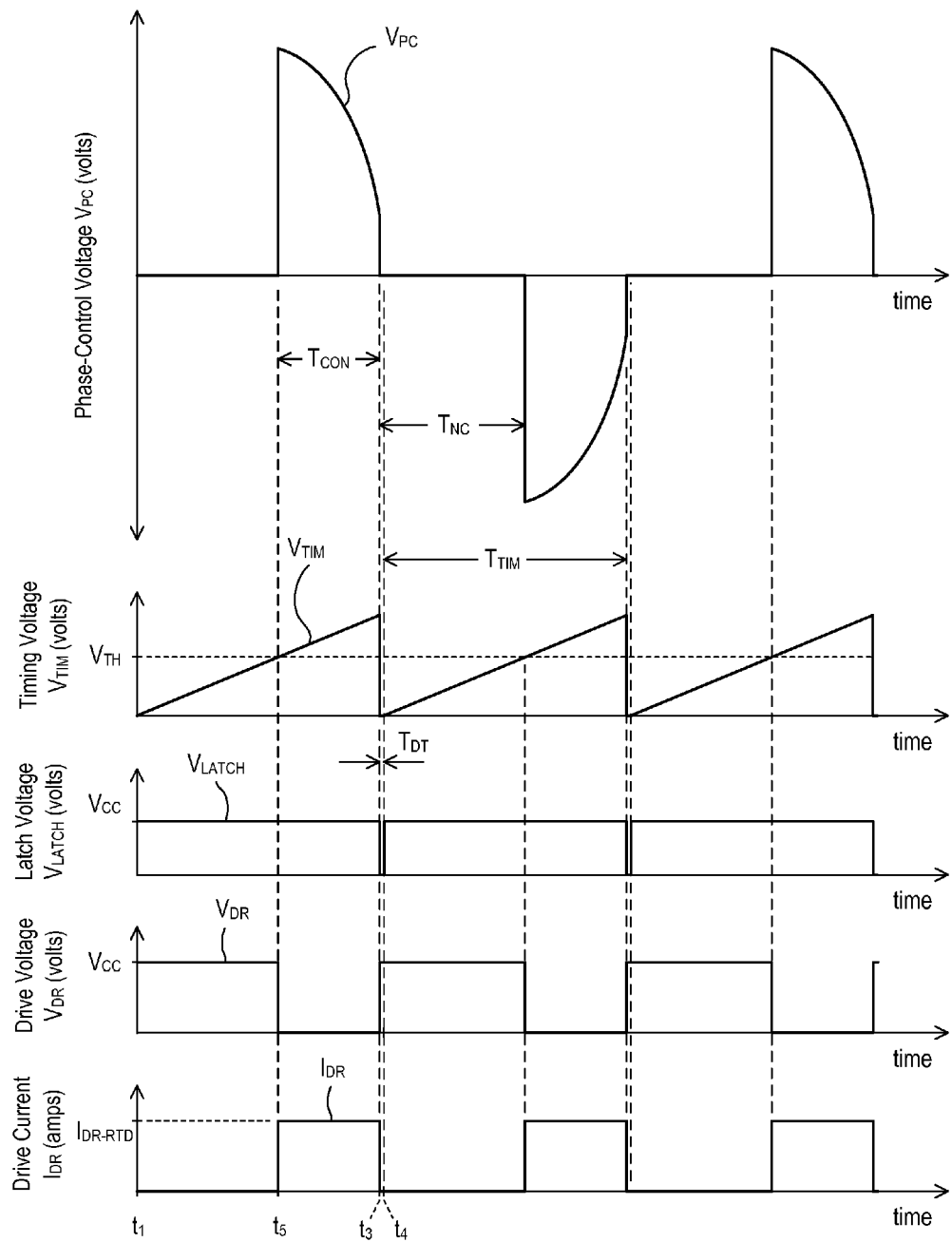

FIG. 2 is a simplified block diagram of the dimmer switch 100 according to a first embodiment of the present invention. FIGS. 3A and 3B show example waveforms illustrating the operation of the dimmer switch 100 according to the first embodiment of the present invention. The dimmer switch 100 comprises a bidirectional semiconductor switch 110 coupled between the hot terminal H and the dimmed hot terminal DH for generating the phase-control voltage $V_{PC}$ (as shown in FIGS. 3A and 3B) and controlling of the amount of power delivered to the LED driver 102. The bidirectional semiconductor switch 110 comprises a control input (e.g., a gate), which may receive control signals for rendering the bidirectional semiconductor switch conductive and non-conductive. The bidirectional semiconductor switch 110 may comprise a single device, such as a triac, or a combination of devices, such as, two field-effect transistors (FETs) coupled in anti-series connection. According to the first embodiment of the present invention, the phase-control voltage $V_{PC}$ comprises a forward phase-control voltage. In other words, the phase-control voltage $V_{PC}$ has a magnitude of approximately zero volts at the beginning of each half cycle during a non-conduction time $T_{NC}$, and has a magnitude equal to approximately the magnitude of the AC line voltage $V_{AC}$ of the AC power source 105 during the rest of the half cycle, i.e., during a conduction time $T_{CON}$. For example, the conduction time $T_{CON}$ may be approximately two milliseconds when the target intensity $L_{TRGT}$ of the LED light source 104 is at the low-end intensity $L_{LE}$ and approximately seven milliseconds when the target intensity $L_{TRGT}$ is at the high-end intensity $L_{HE}$.

The dimmer switch 100 comprises a mechanical air-gap switch S112 electrically coupled to the hot terminal H and in series with the bidirectional semiconductor switch 110, such that the LED light source 104 is turned off when the switch is open. When the air-gap switch S112 is closed, the dimmer switch 100 is operable to control the bidirectional semiconductor switch 110 to control the amount of power delivered to the LED driver 102. The air-gap switch S112 is mechanically coupled to the rocker switch 116 of the user interface of the dimmer switch 100, such that the switch may be opened and closed in response to actuations of the rocker switch. The dimmer switch 100 further comprises a rectifier circuit 114 coupled across the bidirectional semiconductor switch 110 and operable to generate a rectified voltage $V_{RECT}$ (i.e., a signal representative of the voltage developed across the bidirectional semiconductor switch).

According to the first embodiment, the dimmer switch 100 comprises an analog control circuit 115 including a power supply 120, a constant-rate one-shot timing circuit 130, and a variable-threshold trigger circuit 140 (i.e., a gate drive circuit). The control circuit 115 receives the rectified voltage $V_{RECT}$ from the rectifier circuit 114 and conducts a control current $I_{CNTL}$ through the load (i.e., the LED driver 102) in order to generate a drive voltage $V_{DR}$ for controlling the bidirectional semiconductor switch 110 to thus adjust the intensity of the LED light source 104 in response to the intensity adjustment actuator 118. The power supply 120 of the control circuit 115 conducts a charging current $I_{CHRG}$ through the LED driver 102 in order to generate a supply voltage $V_{CC}$ (e.g., approximately 11.4 volts). The charging current $I_{CHRG}$ of the power supply makes up a portion of the control current $I_{CNTL}$ of the control circuit 115.

The timing circuit 130 receives the supply voltage $V_{CC}$ and generates a timing voltage $V_{TIM}$ (i.e., a timing signal), which comprises a ramp signal having a constant rate of increasing magnitude (i.e., a constant positive slope) as shown in FIGS. 3A and 3B. When the bidirectional semiconductor switch 110 is non-conductive at the beginning of each half cycle, the timing circuit 130 also receives the rectified voltage $V_{RECT}$ and is able to derive zero-crossing timing information from the voltage developed across the LED driver 102 (i.e., from the control current $I_{CNTL}$ conducted through the LED driver 102). The timing voltage $V_{TIM}$ begins increasing from approximately zero volts shortly after the zero-crossings of the AC line voltage $V_{AC}$ (i.e., shortly after the beginning of each half cycle as shown at times $t_1$, $t_4$ in FIGS. 3A and 3B) and continues increasing at the constant rate. After a fixed amount of time $T_{TIM}$ has elapsed since the timing voltage $V_{TIM}$ started increasing from zero volts during the present half cycle, the timing voltage $V_{TIM}$ is driven to approximately zero volts near the next zero-crossing (i.e., near the end of the present half cycle as shown at time $t_3$ in FIGS. 3A and 3B). Since the timing voltage $V_{TIM}$ increases in magnitude at the constant rate for the fixed amount of time $T_{TIM}$ each half cycle, the timing voltage $V_{TIM}$ is essentially identical during each half cycle as shown in FIGS. 3A and 3B.

Referring back to FIG. 2, the variable-threshold trigger circuit 140 receives the timing voltage $V_{TIM}$ from the timing circuit 130, and generates a drive voltage $V_{DR}$ (i.e., a gate drive voltage) for controlling the bidirectional semiconductor switch 110 to thus adjust the intensity of the LED light source 104 in response to actuations of the intensity adjustment actuator 118. The trigger circuit 140 is characterized by a variable threshold (i.e., a variable threshold voltage $V_{TH}$ shown in FIGS. 3A and 3B) that may be adjusted in response to the intensity adjustment actuator 118 of the user interface of the dimmer switch 100.

A gate coupling circuit 150 couples the drive voltage $V_{DR}$ to the gate of the bidirectional semiconductor switch 110 for thus rendering the bidirectional semiconductor switch 110 conductive and non-conductive in response to the magnitude of the variable threshold voltage $V_{TH}$. When the magnitude of the timing voltage $V_{TIM}$ exceeds the magnitude of a variable threshold voltage $V_{TH}$ each half cycle (as shown at firing times $t_2$, $t_5$ in FIGS. 3A and 3B), the trigger circuit 140 is operable to drive the drive signal $V_{DR}$ to a first magnitude (e.g., approximately zero volts as shown in FIGS. 3A and 3B) to thus render the bidirectional semiconductor switch 110 conductive each half cycle (as will be described in greater detail below with reference to FIG. 4). The drive signal $V_{DR}$ is then driven to a second magnitude (e.g., approximately the supply voltage $V_{CC}$ as shown in FIGS. 3A and 3B) to render the bidirectional semiconductor switch 110 non-conductive when the timing voltage $V_{TIM}$ is controlled to approximately zero volts shortly before the next zero-crossing. The variable threshold voltage $V_{TH}$ is shown at two different magnitudes in FIGS. 3A and 3B, which results in the drive signal $V_{DR}$ being driven low to zero volts (and thus rendering the bidirectional semiconductor switch 110 conductive) for different amounts of time.

As shown in FIGS. 3A and 3B, the control circuit 115 of the dimmer switch 100 is operable to provide a constant gate drive to the bidirectional semiconductor switch 110 by maintaining the drive voltage $V_{DR}$ low for the remainder of the half cycle after the bidirectional semiconductor switch 110 is rendered conductive (as shown at firing times $t_2$, $t_5$). Accordingly, the bidirectional semiconductor switch 110 will remain conductive independent of the magnitude of the load current $I_{LOAD}$ conducted through the bidirectional semiconductor switch and the LED driver 102. When the bidirectional semiconductor switch 110 is conductive and the magnitude of the phase control voltage $V_{PC}$ is greater than approximately the magnitude of the bus voltage $V_{BUS}$ of the LED driver 102, the LED driver 102 will begin to conduct the load current $I_{LOAD}$ through the bidirectional semiconductor switch. Since the bus capacitor $C_{BUS}$ of the LED driver 102 may charge quickly, the magnitude of the load current $I_{LOAD}$ may quickly peak before subsiding down to a substantially small magnitude (e.g., approximately zero amps). As previously mentioned, the bidirectional semiconductor switch 110 will remain conductive independent of the magnitude of the load current $I_{LOAD}$ because the control circuit 115 is providing constant gate drive to the bidirectional semiconductor switch. In addition to quickly increasing and decreasing in magnitude, the load current $I_{LOAD}$ may also change direction after the bidirectional semiconductor switch 110 is rendered conductive. Therefore, the bidirectional semiconductor switch 110 is also operable to conduct current in both directions (i.e., to and from the LED driver 102) after the bidirectional semiconductor switch is rendered conductive during a single half cycle, thereby allowing any capacitors in the filter network 108 of the LED driver 102 to follow the magnitude of the AC line voltage $V_{AC}$ of the AC power source 105.

Figure 4:
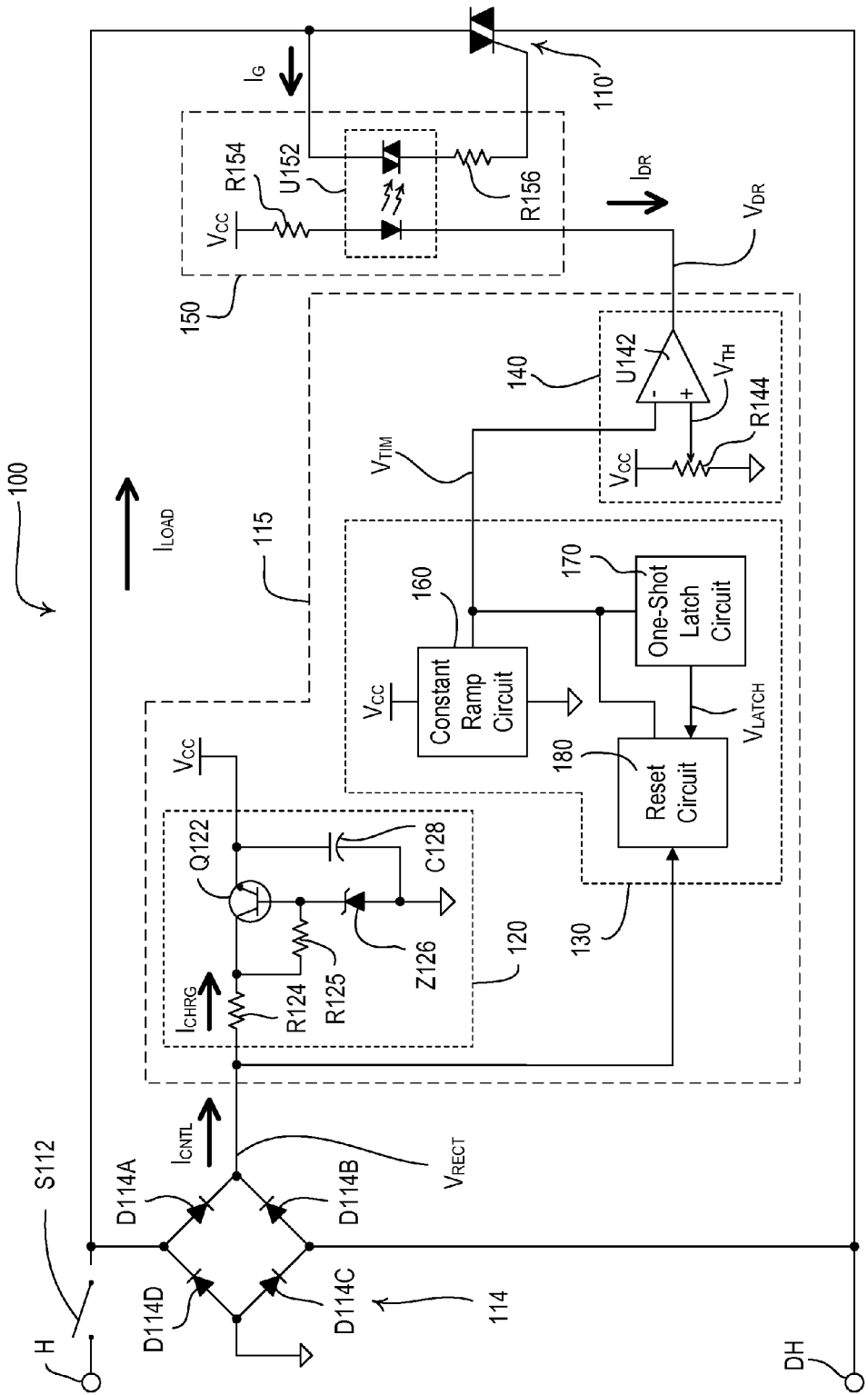
FIG. 4 is a simplified schematic diagram of the dimmer switch of FIG. 2 according to the first embodiment of the present invention.

FIG. 4 is a simplified schematic diagram of the dimmer switch 100. As shown in FIG. 4, the bidirectional semiconductor switch 110 of the dimmer switch 100 of the first embodiment is implemented as a triac 110', but may alternatively be implemented as one or more silicon-controlled rectifiers (SCRs), or any suitable thyristor. The triac 110' comprises two main terminals that are coupled in series electrical connection between the hot terminal H and the dimmed hot terminal DH, such that the triac is adapted to be coupled in series electrical connection between the AC power source 105 and the LED driver 102 for conducting the load current $I_{LOAD}$ to the LED driver. The triac 110' comprises a gate (i.e., a control input) for rendering the triac conductive each half cycle of the AC power source 105 as will be described in greater detail below. While not shown in FIG. 4, a choke inductor may be coupled in series with the triac 110', and a filter circuit (such as a filter capacitor) may be coupled between the hot terminal H and the dimmed hot terminal DH (i.e., in parallel with the triac) to prevent noise generated by the switching of the triac from being conducted on the AC mains wiring.

The rectifier circuit 114 comprises a full-wave rectifier bridge having four diodes D114A, D114B, D114C, D114D. The rectifier bridge of the rectifier circuit 114 has AC terminals coupled in series between the hot terminal H and the dimmed hot terminal DH, and DC terminals for providing the rectified voltage $V_{RECT}$ to the timing circuit 130 when the triac 110' is non-conductive and a voltage is developed across the dimmer switch 100. The control circuit 115 conducts the control current $I_{CNTL}$ through the rectifier circuit 114 and the LED driver 102. Accordingly, the total current conducted through the LED driver 102 each half cycle is the sum of the load current $I_{LOAD}$ conducted through the bidirectional semiconductor switch 110, the control current $I_{CNTL}$ conducted through the control circuit 115 of the dimmer switch 100, and any leakage current conducted through the filter circuit (that may be coupled between the hot terminal H and the dimmed hot terminal DH).

As shown in FIG. 4, the power supply 120 comprises, for example, a pass-transistor circuit that generates the supply voltage $V_{CC}$. The pass-transistor circuit comprises an NPN bipolar junction transistor Q122 having a collector coupled to receive the rectifier voltage $V_{RECT}$ through a resistor R124 (e.g., having a resistance of approximately 100 kΩ). The base of the transistor Q122 is coupled to the rectifier voltage $V_{RECT}$ through a resistor R125 (e.g., having a resistance of approximately 150 kΩ), and to circuit common through a zener diode Z126 (e.g., having a break-over voltage of approximately 12 volts). The power supply 120 further comprises a storage capacitor C128, which is able to charge through the transistor Q122 to a voltage equal to approximately the break-over voltage of the zener diode Z126 minus the base-emitter drop of the transistor Q122. The storage capacitor C128 has, for example, a capacitance of approximately 10 μF, and operates to maintain the supply voltage $V_{CC}$ at an appropriate magnitude (i.e., approximately 11.4 volts) to allow the timing circuit 120 to generate the timing voltage $V_{TIM}$ and the gate coupling circuit 150 to continue rendering the triac 110' conductive after the firing times each half cycle.

The timing circuit 130 comprises a constant ramp circuit 160, a one-shot latch circuit 170, and a reset circuit 180. The constant ramp circuit 160 receives the supply voltage $V_{CC}$ and causes the timing voltage $V_{TIM}$ to increase in magnitude at the constant rate. The reset circuit 180 receives the rectified voltage $V_{RECT}$ and is coupled to the timing voltage $V_{TIM}$, such that the reset circuit is operable to start the timing voltage $V_{TIM}$ increasing in magnitude from approximately zero volts shortly after the beginning of each half cycle at a half cycle start time (e.g., times $t_1$, $t_4$ in FIGS. 3A and 3B). Specifically, the reset circuit 180 is operable to enable the timing voltage $V_{TIM}$ (i.e., to start the increase of the magnitude of the timing voltage $V_{TIM}$) in response to a positive-going transition of the rectified voltage $V_{RECT}$ across a reset threshold $V_{RST}$ that remains above the reset threshold $V_{RST}$ for at least a predetermined amount of time. The one-shot latch circuit 170 provides a latch voltage $V_{LATCH}$ to the reset circuit 180 to prevent the reset circuit 180 from resetting the timing voltage $V_{TIM}$ until the end of the half cycle, thus ensuring that the reset circuit only restarts the generation of the timing voltage once each half cycle.

The one-shot latch circuit 170 stops the generation of the timing voltage $V_{TIM}$ by controlling the magnitude of the timing voltage $V_{TIM}$ to approximately 0.6 volts at the end of the fixed amount of time from when the reset circuit 180 enabled the timing voltage $V_{TIM}$ (e.g., near the end of the half cycle at time $t_3$ in FIGS. 3A and 3B). After the one-shot latch circuit 170 controls the magnitude of the timing voltage $V_{TIM}$ to approximately 0.6 volts, the reset circuit 180 is once again able to enable the generation of the timing voltage $V_{TIM}$ after the beginning of the next half cycle (i.e., at time $t_4$ in FIGS. 3A and 3B). As a result, a dead time $T_{DT}$ exists between the time when the one-shot latch circuit 170 drives the timing voltage $V_{TIM}$ to approximately 0.6 volts and the reset circuit 180 enables the generation of the timing voltage $V_{TIM}$ by controlling the magnitude of the timing voltage $V_{TIM}$ down to approximately zero volts.

The variable-threshold trigger circuit 140 comprises a comparator U142 having an inverting input that receives the timing voltage $V_{TIM}$ from the timing circuit 130. The variable-threshold trigger circuit 140 also comprises a potentiometer R144 that is mechanically coupled to the slider knob of the intensity adjustment actuator 118. The potentiometer R144 has a resistive element coupled between the supply voltage $V_{CC}$ and circuit common and a wiper terminal that generates the variable threshold voltage $V_{TH}$. The variable threshold voltage $V_{TH}$ comprises a DC voltage that varies in magnitude in response to the position of the slider knob of the intensity adjustment actuator 118 and is provided to a non-inverting input of the comparator U142. The drive voltage $V_{DR}$ is generated at an output of the comparator U142 and is provided to the gate coupling circuit 150 for rendering the triac 110' conductive and non-conductive. The gate coupling circuit 150 comprises an opto-coupler U152 having an input photodiode, which is coupled between the supply voltage $V_{CC}$ and the output of the comparator U142 and in series with a resistor R154 (e.g., having a resistance of approximately 8.2 kΩ). The opto-coupler U152 has an output phototriac that is coupled in series with a resistor R156 (e.g., having a resistance of approximately 100Ω). The series combination of the output phototriac of the opto-coupler U152 and the resistor R156 is coupled between the gate and one of the main terminals of the triac 110' (e.g., to the hot terminal H).

As shown in FIG. 3A and 3B, when the magnitude of the timing voltage $V_{TIM}$ is below the magnitude of the variable threshold voltage $V_{TH}$, the magnitude of the drive voltage $V_{DR}$ at the output of the comparator U142 of the variable-threshold trigger circuit 140 remains high at approximately the supply voltage $V_{CC}$, such that the triac 110' remains non-conductive. When the magnitude of the timing voltage $V_{TIM}$ increases above the variable threshold voltage $V_{TH}$, the comparator U142 drives the drive voltage $V_{DR}$ low to approximately circuit common, such that the input photodiode of the opto-coupler U152 conducts a drive current $I_{DR}$, which may have an rated magnitude $I_{DR-RTD}$ of approximately 2 mA. As a result, the output phototriac of the opto-coupler U152 is rendered conductive and conducts a gate current $I_G$ through the gate of the triac 110', thus rendering the triac conductive. Accordingly, the drive voltage $V_{DR}$ is driven low to render the triac 110' conductive after a variable amount of time has elapsed since the half cycle start time (i.e., the non-conduction time $T_{NC}$ as shown in FIGS. 3A and 3B), where the variable amount of time is adjusted in response to intensity adjustment actuator 118 and the variable threshold voltage $V_{TH}$. Since the magnitude of the drive voltage $V_{DR}$ remains low after the triac 110' is rendered conductive, the input photodiode of the opto-coupler U152 continues to conduct the drive current $I_{DR}$ for the remainder of the half cycle. For example, the input photodiode of the opto-coupler U152 may conduct an average current from the storage capacitor C128 of the power supply 120 where the average current may range from approximately 0.5 milliamps when the target intensity $L_{TRGT}$ of the LED light source 104 is at the low-end intensity $L_{LE}$ to approximately 1.7 milliamps when the target intensity $L_{TRGT}$ is at the high-end intensity $L_{HE}$.

As previously mentioned, the load current $I_{LOAD}$ may change direction after the triac 110' is rendered conductive (i.e., the magnitude of the load current $I_{LOAD}$ transitions from positive to negative or vice versa). When the magnitude of the load current $I_{LOAD}$ falls below the holding current of the triac 110', the triac commutates off and becomes non-conductive. In addition, the gate of the triac 110' stops conducting the gate current $I_G$ and the output phototriac of the opto-coupler U152 becomes non-conductive. However, because the magnitude of the drive voltage $V_{DR}$ remains low and accordingly, the input photodiode of the opto-coupler U152 continues to conduct the drive current $I_{DR}$ (i.e., providing a constant gate drive) even when the triac 110' becomes non-conductive, the output phototriac of the opto-coupler is able to conduct the gate current $I_G$ and the triac 110' is able to be rendered conductive and conduct the load current $I_{LOAD}$ in the opposite direction shortly thereafter. Accordingly, the triac 110' is able to conduct the load current $I_{LOAD}$ in both directions in a single half cycle.

After the triac 110' is rendered conductive each half cycle, the timing circuit 130 continues to generate the timing voltage $V_{TIM}$. Thus, the magnitude of the timing voltage $V_{TIM}$ remains above the variable threshold voltage $V_{TH}$ and the triac 110' remains conductive until approximately the end of the half cycle when the one-shot latch circuit 170 drives the timing voltage to approximately zero volts. The input photodiode of the opto-coupler U152 continues to conduct the drive current $I_{DR}$ and the output phototriac continues to conduct the gate current $I_G$ to render the triac 110' conductive while the drive voltage $V_{DR}$ is driven low each half cycle (as shown in FIGS. 3A and 3B).

According to the first embodiment of the present invention, the latch circuit 170 is operable to control the timing voltage $V_{TIM}$ to approximately zero volts (thus controlling the magnitude of the drive voltage $V_{DR}$ high to approximately the supply voltage $V_{CC}$) shortly before the end of the present half cycle (as shown at time $t_3$ in FIGS. 3A and 3B). Accordingly, the length of the timing voltage $V_{TIM}$ (i.e., the fixed amount of time $T_{TIM}$) is slightly smaller than the length $T_{HC}$ of each half cycle. The dead time $T_{DT}$ (or "blanking pulse") in the timing voltage $V_{TIM}$ at the end of the half cycle allows the triac 110' to commutate off (i.e., become non-conductive) when the magnitude of the load current $I_{LOAD}$ through the triac reduces to approximately zero amps at the end of the half cycle.

Because the LED driver 102 may have a capacitive input impedance, the magnitude of the phase-control voltage $V_{PC}$ may not quickly decrease to zero volts near the zero-crossing of the AC mains lines voltage $V_{AC}$ after the triac 110' becomes non-conductive at the end of each half cycle. Therefore, according to the first embodiment of the present invention, the reset circuit 180 only starts the timing voltage $V_{TIM}$ after a zero-crossing of the AC mains lines voltage $V_{AC}$, i.e., in response to the magnitude of the rectified voltage $V_{RECT}$ exceeding the reset threshold $V_{RST}$ when the rectified voltage is increasing in magnitude. The reset circuit 180 is prevented from resetting the timing voltage $V_{TIM}$ in response to the magnitude of the rectified voltage $V_{RECT}$ dropping below the reset threshold $V_{RST}$, which may or may not happen each half cycle due to the capacitive input impedance of the LED driver 102.

Figure 5:
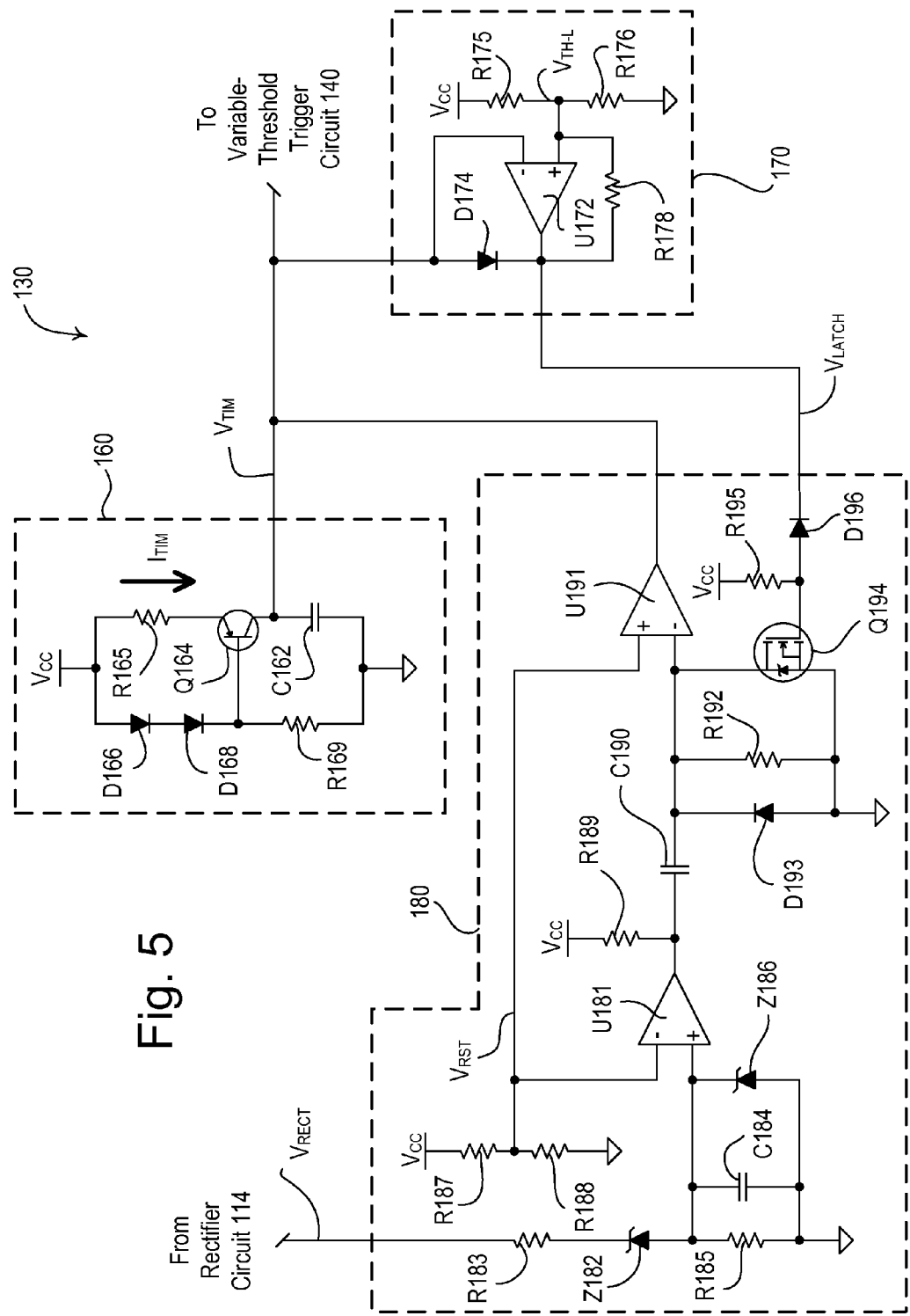
FIG. 5 is a simplified schematic diagram of a timing circuit of the dimmer switch of FIG. 2.

FIG. 5 is a simplified schematic diagram of the timing circuit 130. The constant ramp circuit 160 receives the supply voltage $V_{CC}$ and generates the timing voltage $V_{TIM}$ across a timing capacitor C162 (e.g., having a capacitance of approximately 50 nF). The constant ramp circuit 160 comprises a constant current source for conducting a constant timing current $I_{TIM}$ through the timing capacitor C162, such that the timing voltage $V_{TIM}$ has a constant slope. The constant current source circuit comprises a PNP bipolar junction transistor Q164 having an emitter coupled to the supply voltage $V_{CC}$ via a resistor R165 (e.g. having a resistance of approximately 10 kΩ). Two diodes D166, D168 are coupled in series between the supply voltage $V_{CC}$ and the base of the transistor Q164. A resistor R169 is coupled between the base of the transistor Q164 and circuit common and has, for example, a resistance of approximately 51 kΩ. A voltage having a magnitude of approximately the forward voltage drop of the diode D166 (e.g., approximately 0.6 V) is produced across the resistor R165, such that the resistor conducts the constant timing current $I_{TIM}$ (e.g., approximately 70 μA) into the capacitor C162. The rate at which the magnitude of the timing voltage $V_{TIM}$ increases with respect to time (i.e., $dV_{TIM}/dt$) is a function of the magnitude of the timing current $V_{TIM}$ and the capacitance $C_{C162}$ of the capacitor C162 (i.e., $dV_{TIM}/dt=I_{TIM}/C_{162}$), and may be equal to, for example, approximately 1.4 V/msec.

The one-shot latch circuit 170 comprises a comparator U172 having an inverting input coupled to the timing voltage $V_{TIM}$. The timing voltage $V_{TIM}$ is further coupled to an output of the comparator U172 via a diode D174. The one-shot latch circuit 170 includes a resistive divider, which is coupled in series electrical connection between the supply voltage $V_{CC}$ and circuit common, and comprises two resistors R175, R176 having, for example, resistances of approximately 100 kΩ and 1 MΩ, respectively. The junction of the two resistors R175, R176 produces a latch threshold voltage $V_{TH-L}$, which is provided to a non-inverting input of the comparator U172. The non-inverting input of the comparator U172 is also coupled to the output via a resistor R178 (e.g., having a resistance of approximately 1 kΩ). The latch voltage $V_{LATCH}$ is generated at the output of the comparator U172 and is provided to the reset circuit 180 as will be described in greater detail below.

The reset circuit 180 comprises a first comparator U181 having a non-inverting input that receives the rectified voltage $V_{RECT}$ via the series combination of a zener diode Z182 and a resistor R183 (e.g., having a resistance of approximately 100 kΩ). The parallel combination of a capacitor C184 (e.g., having a capacitance of approximately 1000 pF) and a resistor R185 (e.g., having a resistance of approximately 20 kΩ) is coupled between the non-inverting input of the comparator U181 and circuit common. A zener diode Z186 (e.g., having a break-over voltage of approximately 12 volts) clamps the magnitude of the voltage produced between the non-inverting input of the comparator U181 and circuit common. The reset circuit 180 further comprises a resistive divider that has two resistors R187, R188 (e.g., having resistances of approximately 150 kΩ and 100 kΩ, respectively), and is coupled in series electrical connection between the supply voltage $V_{CC}$ and circuit common. The junction of the two resistors R187, R188 produces a reset threshold voltage $V_{RST}$ (e.g., approximately 4.8 V), which is provided to an inverting input of the comparator U181. An output of the comparator U181 is coupled to the supply voltage $V_{CC}$ via a resistor R189 (e.g., having a resistance of approximately 10 kΩ).

The reset circuit 180 also comprises a second comparator U191 having a non-inverting input coupled to the threshold voltage $V_{RST}$ and an output coupled to the timing voltage $V_{TIM}$. The output of the comparator U181 is coupled to an inverting input of the second comparator U191 via a capacitor C190 (e.g., having a capacitance of approximately 1000 pF). A resistor R192 (e.g., having a resistance of approximately 68 kΩ) and a diode D193 are coupled between the inverting input of the comparator U191 and circuit common. A FET Q194 is also coupled between the inverting input and circuit common. The gate of the FET Q194 is pulled up towards the supply voltage $V_{CC}$ through a resistor R195 (e.g., having a resistance of approximately 100 kΩ), and is coupled to the latch voltage $V_{LATCH}$, such that the FET may be rendered conductive and non-conductive in response to the one-shot latch circuit 170.

When the timing voltage $V_{TIM}$ starts out at approximately zero volts, the inverting input of the comparator U172 of the latch circuit 170 is less than the latch threshold voltage $V_{TH-L}$ (e.g., approximately 10.5 V) at the non-inverting input and the output is pulled up towards the supply voltage $V_{CC}$ via the resistor R195 and the diode D196 of the reset circuit 180. The magnitude of the timing voltage $V_{TIM}$ continues to increase at the constant rate until the magnitude of timing voltage exceeds the latch threshold voltage $V_{TH-L}$, at which time, the comparator U172 of the latch circuit 170 drives the output low to approximately zero volts. At this time, the magnitude of the timing voltage $V_{TIM}$ is reduced to approximately the forward voltage drop of the diode D174 (e.g., approximately 0.6 V). Accordingly, the fixed amount of time $T_{TIM}$ that the timing voltage $V_{TIM}$ is generated each half cycle is a function of the constant rate at which the magnitude of the timing voltage $V_{TIM}$ increases with respect to time $dV_{TIM}/dt$ (i.e., approximately 1.4 V/msec) and the magnitude of the latch threshold voltage $V_{TH-L}$ (i.e., approximately 10.5 V), such that the fixed amount of time $T_{TIM}$ is approximately 7.5 msec each half cycle. After the magnitude of the timing voltage $V_{TIM}$ has exceeded the latch threshold voltage $V_{TH-L}$, the latch threshold voltage $V_{TH-L}$ is reduced to approximately 0.1 V, such that the comparator U172 continues to drive the output low and the magnitude of the timing voltage $V_{TIM}$ is maintained at approximately 0.6 V.

At the beginning of a half cycle, the magnitude of the rectified voltage $V_{RECT}$ is below a break-over voltage of the zener diode Z182 of the reset circuit 180 (e.g., approximately 30 V) and the voltage at the non-inverting input of the first comparator U181 is approximately zero volts, such that the output of the first comparator is driven low towards circuit common. When the magnitude of the rectified voltage $V_{RECT}$ exceeds approximately the break-over voltage of the zener diode Z182, the capacitor C184 begins to charge until the magnitude of the voltage at the non-inverting input of the first comparator U181 exceeds the reset threshold voltage $V_{RST}$. The output of the first comparator U181 is then driven high towards the supply voltage $V_{CC}$ and the capacitor C190 conducts a pulse of current into the resistor R192, such that the magnitude of the voltage at the inverting input of the second comparator U191 exceeds the reset threshold voltage $V_{RST}$, and the second comparator pulls the timing voltage $V_{TIM}$ down towards circuit common (i.e., the magnitude of the timing voltage is controlled from approximately 0.6 volts to zero volts). The magnitude of the voltage at the inverting input of the comparator U172 of the latch circuit 170 is now less than the latch threshold voltage $V_{TH-L}$ (i.e., approximately 0.1 V), and the comparator stops pulling the timing voltage $V_{TIM}$ down towards circuit common. In addition, the reset circuit 180 only drives the timing voltage $V_{TIM}$ low for a brief period of time (e.g., approximately 68 μsec) before the capacitor C190 fully charges and then stops conducting the pulse of current into the resistor R192. Accordingly, the second comparator U191 then stops pulling the timing voltage $V_{TIM}$ down towards circuit common, thus allowing the timing voltage to once again begin increasing in magnitude with respect to time at the constant rate.

After the reset circuit 180 resets the generation of the timing voltage $V_{TIM}$ after the beginning of each half cycle, the comparator U172 of the latch circuit 170 stops pulling the timing voltage $V_{TIM}$ down towards circuit common and the magnitude of the latch voltage $V_{LATCH}$ is pulled high towards the supply voltage $V_{CC}$ via the resistor R195 and the diode D196. At this time, the FET Q194 is rendered conductive, thus maintaining the inverting input of the second comparator U191 less than the reset threshold voltage $V_{RST}$. The FET Q194 is rendered non-conductive when the comparator U172 of the one-shot latch circuit 170 pulls the timing voltage $V_{TIM}$ low near the end of the half cycle. Thus, the FET Q194 is rendered conductive for most of each half cycle and prevents the reset circuit 180 from resetting the generation of the timing voltage $V_{TIM}$ until after the latch circuit 170 ceases the generation of the timing voltage, thereby greatly improving the noise immunity of the dimmer switch 100 with respect to impulse noise on the AC line voltage $V_{AC}$.

When the magnitude of the voltage at the non-inverting input of the first comparator U181 of the reset circuit 170 exceeds the reset threshold voltage $V_{RST}$, the output is then driven high towards the supply voltage $V_{CC}$ and the capacitor C190 charges. The FET Q194 is then rendered conductive, and the capacitor C190 remains charged. When the magnitude of the rectified voltage $V_{RECT}$ drops below the breakover voltage of the zener diode Z182 at the end of each half cycle and the magnitude of the voltage at the non-inverting input of the first comparator U181 drops below the reset threshold voltage $V_{RST}$, the capacitor C190 discharges through the diode D193 and the output of the first comparator U181. However, the magnitude of the voltage at the inverting input of the second comparator U191 remains less than the reset threshold voltage $V_{RST}$, and thus the reset circuit 180 does not reset the generation of the timing voltage $V_{TIM}$ until the magnitude of the voltage at the non-inverting input of the first comparator U181 of the reset circuit 170 rises above the reset threshold voltage $V_{RST}$ at the beginning of the next half cycle.

Accordingly, the control circuit 115 of the dimmer switch 100 of the first embodiment of the present invention conducts a control current through the LED driver 102 and provides constant gate drive to the bidirectional semiconductor switch 110 after the bidirectional semiconductor switch is rendered conductive. The control circuit 115 is operable to derive zero-crossing timing information from the voltage developed across the LED driver 102, and thus from the control current $I_{CNTL}$ conducted through the LED driver 102. The average magnitude of the control current $I_{CNTL}$ conducted through the LED driver 102 is approximately equal to the sum of the average magnitude of the timing current $I_{TIM}$ and the drive current $I_{DR}$, as well as the other currents drawn by the timing circuit 130 and the trigger circuit 140. The control circuit 115 is operable to render the bidirectional semiconductor switch 110 conductive each half cycle in response to the variable threshold that is representative of the desired intensity of the LED light source 104 and to maintain the bidirectional semiconductor switch conductive until approximately the end of the present half cycle. As a result, the conduction time $T_{CON}$ of the drive voltage $V_{DR}$ generated by the trigger circuit 140 has a length that is not dependent upon the length of the fixed amount of time $T_{TIM}$ that the timing circuit 130 generates the timing signal $V_{TIM}$.

Figure 6:
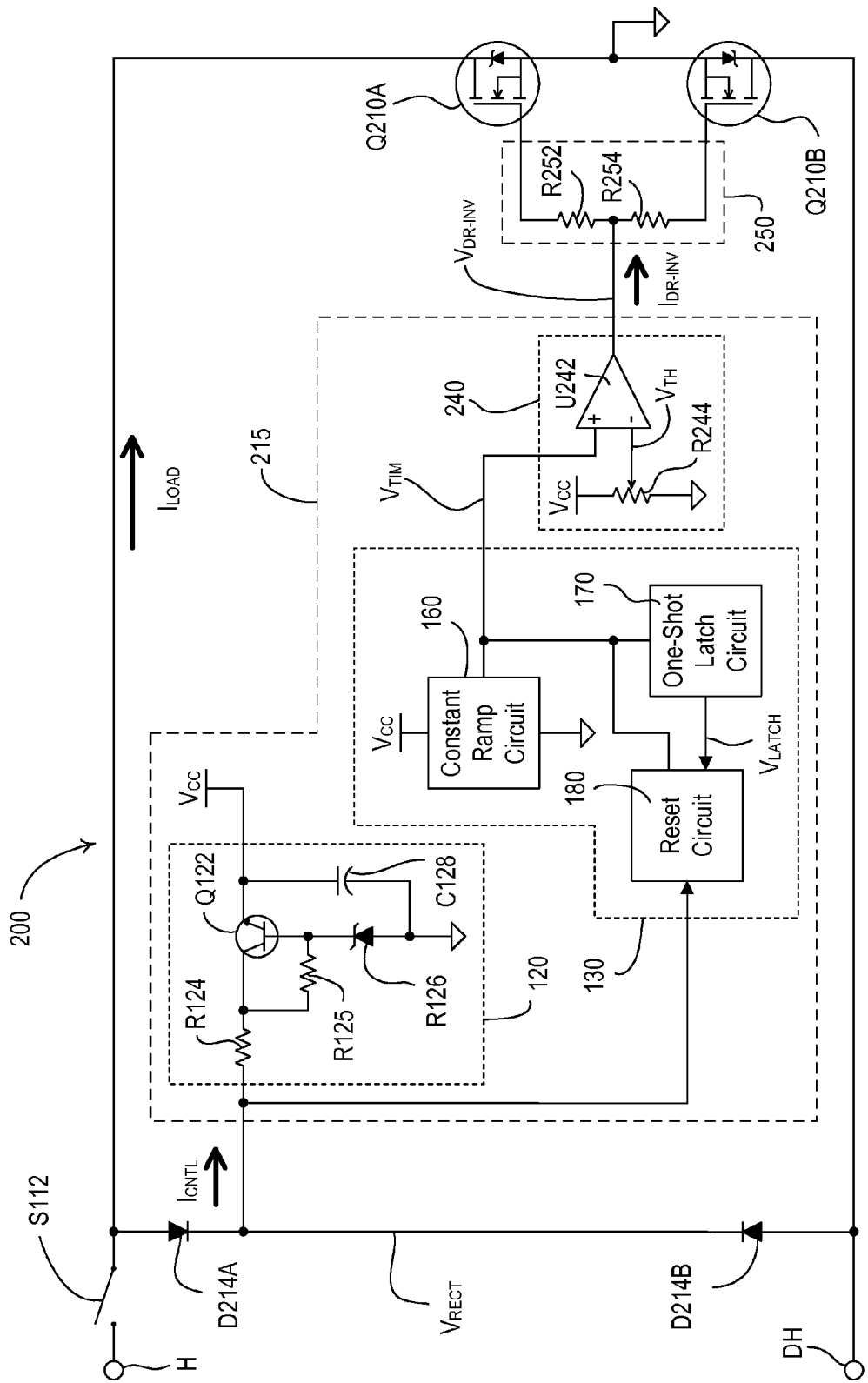
FIG. 6 is a simplified schematic diagram of a dimmer switch according to a second embodiment of the present invention.
Figure 7:
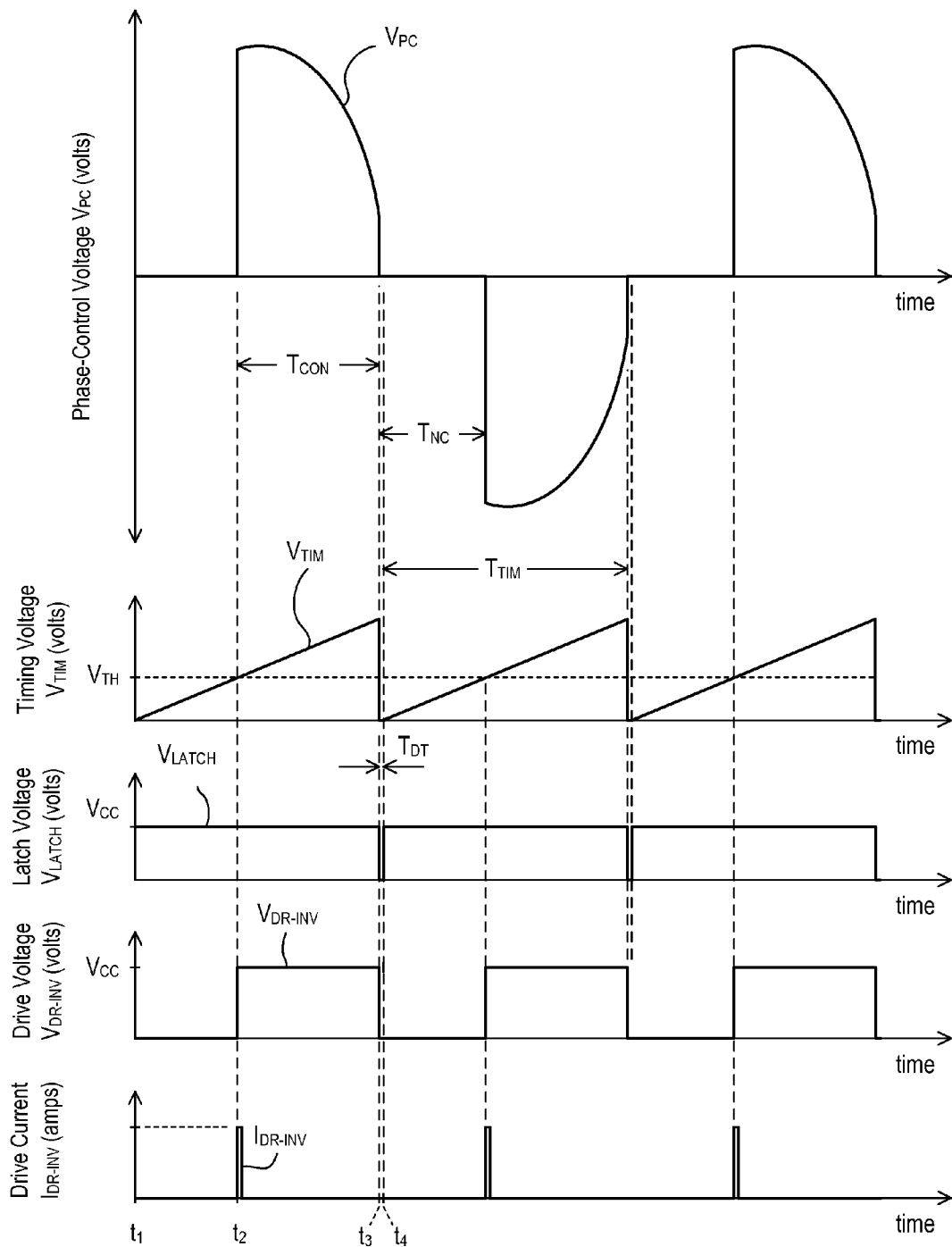
FIG. 7 shows example waveforms illustrating the operation of the dimmer switch of FIG. 6 according to the second embodiment of the present invention.

FIG. 6 is a simplified schematic diagram of a dimmer switch 200 according to a second embodiment of the present invention. FIG. 7 shows example waveforms illustrating the operation of the dimmer switch 200 according to the second embodiment of the present invention. The bidirectional semiconductor switch of the dimmer switch 200 of the second embodiment is implemented as two individual MOS-gated transistors, e.g., FETs Q210A, Q210B, coupled in anti-series connection between the hot terminal H and the dimmed hot terminal DH for control of the amount of power delivered to the LED driver 102. The sources of the FETs Q210A, Q210B are coupled together at circuit common. The FETs Q210A, Q210B may comprise metal-oxide semiconductor FETs (MOSFETs) or may alternatively be replaced by any suitable voltage-controlled semiconductor switches, such as, for example, insulated gate bipolar junction transistors (IGBTs). The FETs Q210A, Q210B have control inputs (i.e., gates) that are coupled to a gate coupling circuit 250, which comprises respective gate resistors R252, R254 (e.g., each having a resistance of approximately 47 Ω) for coupling to the gates of the FETs a drive voltage $V_{DR-INV}$. The drive voltage $V_{DR-INV}$ as shown in FIG. 7 is the inverse of the drive voltage $V_{DR}$ of the first embodiment. Each FET Q210A, Q210B is rendered conductive when the voltage at the gates of the FET is driven to a rated gate threshold voltage (e.g., approximately 10 volts). The FETs Q210A, Q210B are simultaneously controlled to be conductive and non-conductive using the forward phase-control technique, and are operable to be rendered conductive and to remain conductive independent of the magnitude of the load current $I_{LOAD}$ conducted through the FETs.

The dimmer switch 200 comprises a full-wave rectifier bridge that includes the body diodes of the two FETs Q210A, Q210B in addition to two diodes D214A, D214B. The timing circuit 130 of the dimmer switch 200 of the second embodiment operates in the same manner as in the first embodiment. The dimmer switch 200 comprises an analog control circuit 215 having a variable-threshold trigger circuit 240 that is similar to the variable-threshold trigger circuit 140 of the first embodiment. However, the trigger circuit 240 of the second embodiment comprises a comparator U242 having a non-inverting input that receives the timing voltage $V_{TIM}$ and an inverting input that receives a variable threshold voltage $V_{TH}$ from a potentiometer R244. The trigger circuit 240 operates to drive the drive voltage $V_{DR-INV}$ high towards the supply voltage $V_{CC}$ to render the FETs Q210A, Q210B conductive, and low towards circuit common to render the FETs non-conductive (as shown in FIG. 7).

As shown in FIG. 7, the gates of the FETs Q210A, Q210B only conduct a small pulse of drive current $I_{DR-INV}$ from the power supply 120 when the FETs Q210A, Q210B are rendered conductive, i.e., due to the charging of the input capacitances of the gates of the FETs (which each may have, for example, an input capacitance of approximately 100 pF). Since the drive current $I_{DR-INV}$ is conducted from the storage capacitor C128 of the power supply 120, the average magnitude of the control current $i_{CNTL}$ conducted through the LED driver 102 by the analog control circuit 215 of the dimmer switch 200 of the second embodiment is less than the average magnitude of the control current $i_{CNTL}$ conducted by the analog control circuit 115 of the dimmer switch 100 of the first embodiment (which conducts the drive current $I_{DR}$ through the input photodiode of the opto-coupler U152 for the entire time that the triac 110' is rendered conductive).

In addition, the dimmer switch 200 of the second embodiment does not require the opto-coupler U152 of the first embodiment, which is typically expensive and is also characterized by a rated turn-on time (e.g., approximately 35 microseconds). In the event that the load current $I_{LOAD}$ changes direction after the triac 110' is rendered conductive, the rated turn-on time of the opto-coupler U152 limits how quickly the triac 110' can be rendered conductive after becoming non-conductive. Specifically, during the time from when the triac 110' becomes momentarily non-conductive and is once again rendered conductive, the magnitude of the phase-control voltage $V_{PC}$ across the LED driver 102 decreases while the magnitude of the voltage across the dimmer switch 100 increases. This change in the voltage across the input of the LED driver 102 (or electronic ballast) may result in fluctuations in the intensity of the LED light source 104 (or fluorescent lamp) for some high-efficiency lighting loads. Because the bidirectional semiconductor switch of the dimmer switch 200 is implemented as FETs Q210A, Q210B and because the FETs Q210A, Q210B are operable to remain conductive independent of the magnitude of the load current, potential fluctuations in the intensity of some high-efficiency lighting loads are avoided.

Figure 8:
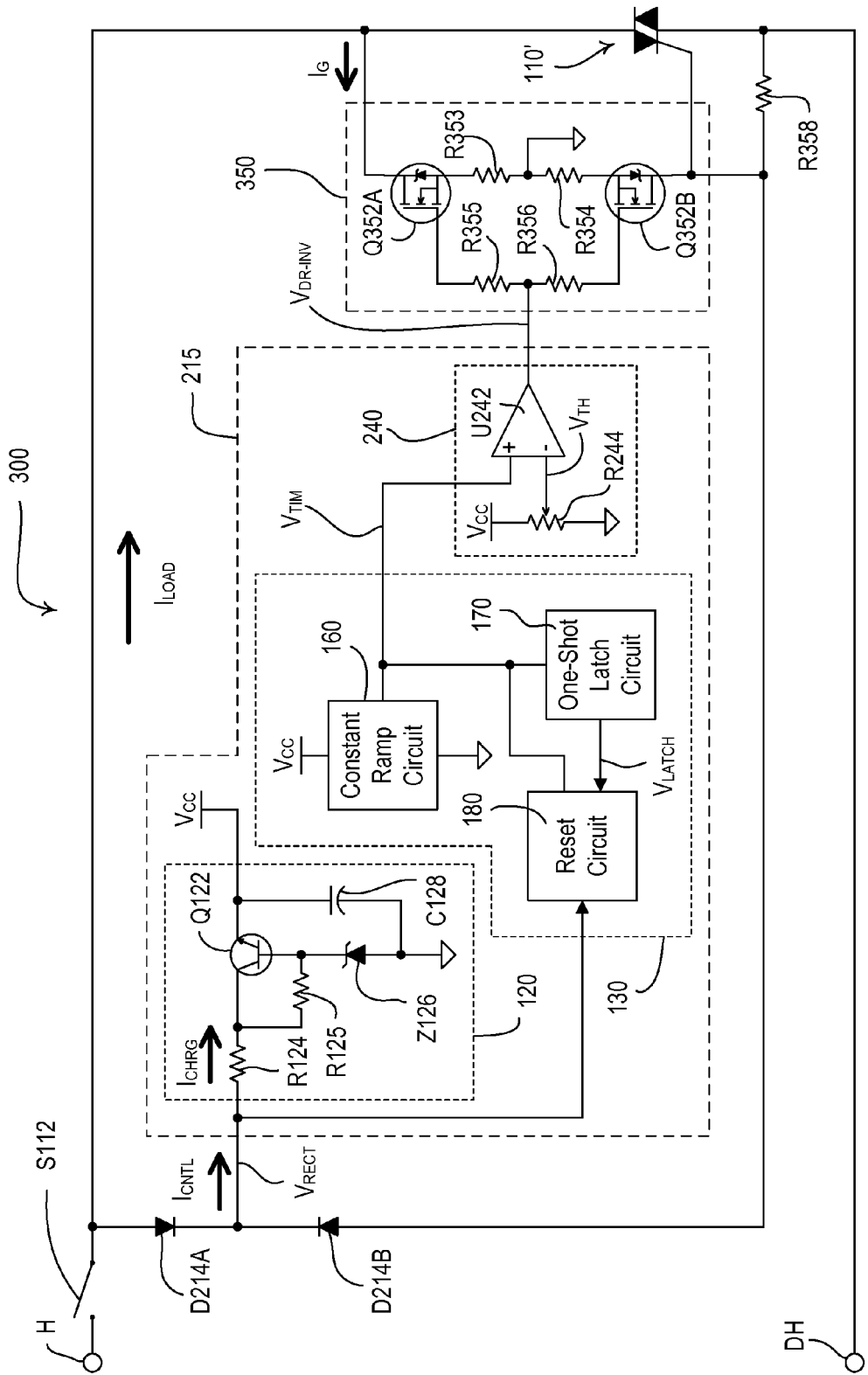
FIG. 8 is a simplified schematic diagram of a dimmer switch according to a third embodiment of the present invention.

FIG. 8 is a simplified schematic diagram of a dimmer switch 300 according to a third embodiment of the present invention. The dimmer switch 300 of the third embodiment comprises the triac 110' (as in the first embodiment). However, the dimmer switch 300 includes a gate coupling circuit 350 that comprises a voltage-controlled controllably conductive device, such as two MOS-gated transistors (e.g., FETs Q352A, Q352B) coupled in anti-series connection between the gate and a first one of the main load terminals of the triac 110' (e.g., the hot terminal H of the dimmer switch). The FETs Q352A, Q352B may comprise MOSFETs or may alternatively be replaced by any suitable voltage-controlled semiconductor switches, such as, for example, IGBTs. The sources of the FETs Q352A, Q352B are coupled together through two source resistors R353, R354 (e.g., each having a resistance of approximately 10Ω), where the junction of the two resistors R353, R354 is coupled to circuit common. The source resistors R353, R354 operate to limit the magnitude of the gate current $I_G$ conducted through the gate of the triac 110' to a maximum gate current (e.g., approximately 0.6 amp). The gates of the FETs Q352A, Q352B are coupled to respective gate resistors R355, R356 (e.g., each having a resistance of approximately 47Ω). The drive voltage $V_{DR-INV}$ generated by the analog control circuit 215 is received at a control input of the gate coupling circuit 350 (i.e., the junction of the gate resistors R355, R356).

The dimmer switch 300 comprises a resistor R358, which has a resistance of, for example, approximately 30.9 Ω and is coupled between the gate and a second one of the main load terminals of the triac 110' (e.g., to the dimmed hot terminal DH of the dimmer switch). The dimmer switch 300 further comprises a full-wave rectifier bridge that includes the body diodes of the FETs Q352A, Q352B and the diodes D214A, D214B, and generates the rectified voltage $V_{RECT}$ that is received by the power supply 120 and the timing circuit 130 of the control circuit 215. Accordingly, the control circuit 215 is coupled to the first main load terminal of the triac 110' through the body diode of the FET Q352A and the diode D214A, and to the second main load terminal of the triac through the body diode of the FET Q352B, the diode D214B, and the resistor R358. Alternatively, the control circuit 215 could be directly coupled to at least one of the main load terminals of the triac 110', or electrically coupled to at least one of the main load terminals of the triac through one or more resistors.

The timing circuit 130 of the control circuit 215 generates the timing voltage $V_{TIM}$ and the variable-threshold trigger circuit 240 generates the drive voltage $V_{DR-INV}$ as in the second embodiment (as shown in FIG. 7). When the drive voltage $V_{DR-INV}$ is driven low towards circuit common, the FETs Q352A, Q352B are non-conductive, such that the triac 110' is also non-conductive. When the trigger circuit 240 drives the drive voltage $V_{DR-INV}$ high towards the supply voltage $V_{CC}$ at the firing time each half cycle, the FETs Q352A, Q352B are able to conduct the gate current $I_G$ through the gate of the triac 110' to render the triac conductive. The drive voltage $V_{DR-INV}$ is driven low slightly before the end of the half cycle, such that the blanking pulse exists at the end of the half cycle to allow the triac 110' to commutate off. Since the drive voltage $V_{DR-INV}$ remains high until approximately the end of the half-cycle, the FETs Q352A, Q352B remain conductive such that the FETs Q352A, Q352B are able to conduct the gate current $I_G$ at any time from the firing time through approximately the remainder of the half cycle. Accordingly, the triac 110' is rendered conductive from the firing time to approximately the end of the half cycle, thereby allowing the load current $I_{LOAD}$ to be either polarity (i.e., positive or negative) in any given half cycle, which is particularly important when the LED driver 102 has a capacitive impedance and causes the load current to change polarity before one of the zero-crossings.

The control input of the gate coupling circuit 350 only conducts the small pulses of drive current $I_{DR-INV}$ from the power supply 120 when the FETs Q352A, Q352B are rendered conductive due to the charging of the input capacitances of the gates of the FETs (i.e., as shown in FIG. 7). Thus, the gate coupling circuit 350 allows the analog control circuit 215 to render the triac 110' conductive and maintain the triac conductive without the need to conduct the drive current $I_{DR-INV}$ through the control input of the gate coupling circuit during approximately the remainder of the half cycle (e.g., in contrast to the input photodiode of the optocoupler U152 of the first embodiment conducting the drive current $I_{DR}$ as shown in FIGS. 3A and 3B). Accordingly, the average magnitude of the control current $I_{CNTL}$ conducted by the analog control circuit 215 of the dimmer switch 300 of the third embodiment to render the triac 110' conductive is less than the average magnitude of the control current $I_{CNTL}$ conducted by the analog control circuit 115 of the dimmer switch 100 of the first embodiment to render the triac 110' conductive. For example, if the FETs Q352A, Q352B are each characterized by a turn-on time of approximately two microseconds, an input impedance of approximately 100 pF, and a gate threshold voltage of approximately 10 volts, the gate coupling circuit 350 may conduct an average current of approximately 240 nanoamps from the storage capacitor C128 of the power supply 120 (independent of the target intensity $L_{TRGT}$ of the LED light source 104).

In addition, the dimmer switch 300 of the third embodiment does not require the opto-coupler U152 to render the triac 110' conductive. As previously mentioned, the opto-coupler U152 is typically expensive and is characterized by the rated turn-on time, which limits how quickly the triac 110' can be rendered conductive after becoming non-conductive in response to the load current $I_{LOAD}$ changing directions.

Since the magnitude of the gate current $I_G$ conducted by the FETs Q352A, Q352B of the gate coupling circuit 350 is much less than the magnitude of the load current $I_{LOAD}$ conducted by the triac 110', the FETs Q352A, Q352B of the third embodiment may be sized smaller in power rating (and accordingly, in physical size) than the FETs Q210A, Q210B of the dimmer switch 200 of the second embodiment (which conduct the load current $I_{LOAD}$). In other words, because the FETs Q352A, Q352B of the third embodiment do not conduct the load current $I_{LOAD}$, the FETs need not be power devices, but can rather be signal-level devices. Therefore, the dimmer switch 300 of the third embodiment only requires one power device (i.e., the triac 110') rather than two power devices (i.e., the FETs Q210A, Q210B), which leads to lower total cost of the dimmer switch 300, as well as fewer constraints to physically fit and heat sink two power devices in a single wall-mounted load control device. In addition, the triac 110' typically has better peak current capabilities in a single package as compared to the two FETs Q210A, Q210B having similar sized packages.

Accordingly, the triac 110' and the gate coupling circuit 350 of the dimmer switch 300 of the third embodiment provide a thyristor-based load control circuit that requires substantially no net average current to be conducted through the control input after the triac is rendered conductive through the remainder of the half-cycle using a constant gate drive signal. As used herein, "substantially no net average current" is defined as an amount of current appropriate to charge the input capacitances of the gates of the FETs Q352A, Q352B (or other suitable switching devices) of the gate coupling circuit 350, for example, less than approximately one microamp.

Figure 9:
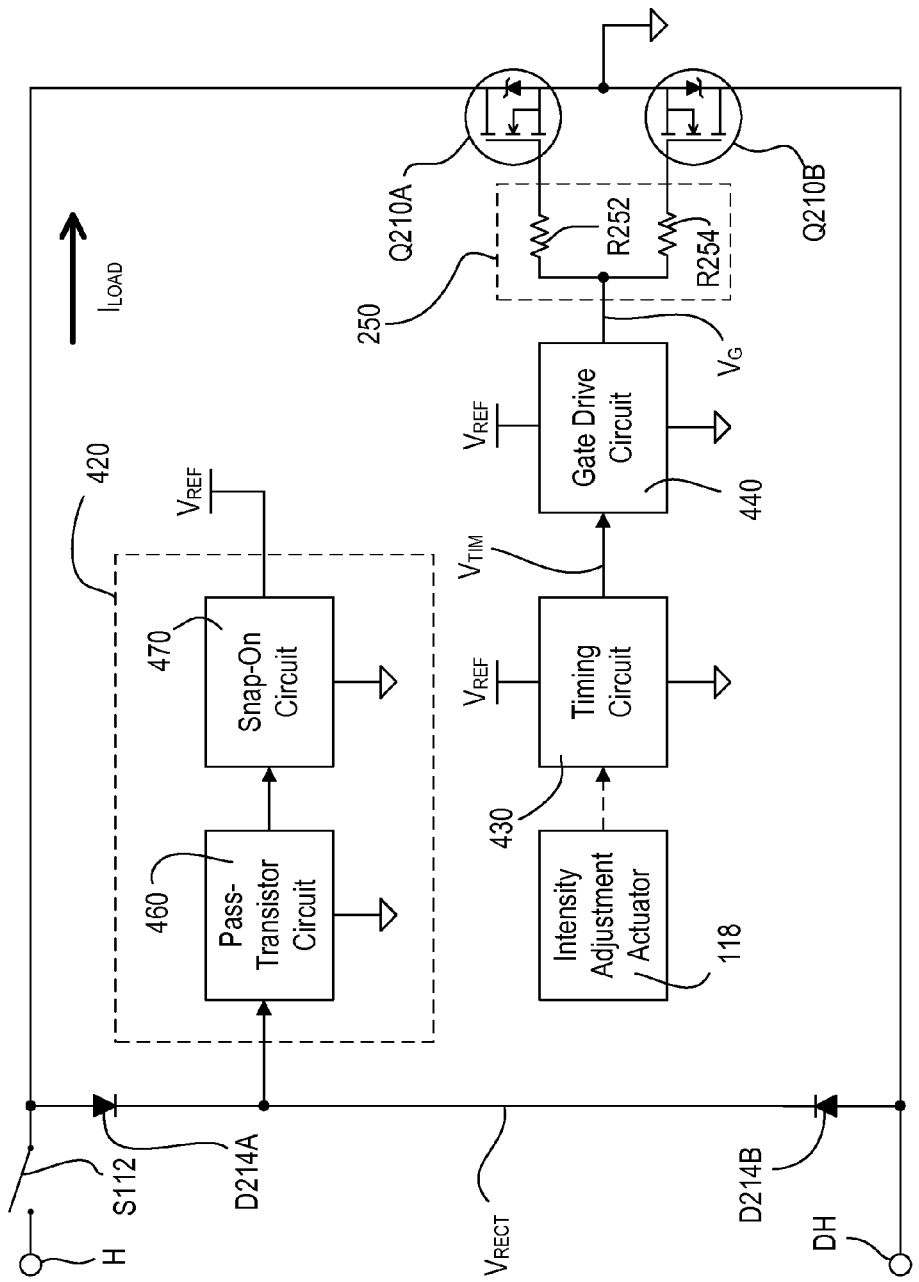
FIG. 9 is a simplified block diagram of a reverse-phase control dimmer switch according to a fourth embodiment of the present invention.

FIG. 9 is a simplified block diagram of a reverse-phase control dimmer switch 400 according to a fourth embodiment of the present invention. As shown in FIG. 9, the bidirectional semiconductor switch 110 is implemented as two FETs Q210A, Q210B coupled in anti-series connection (as in the second embodiment). The dimmer switch 100 comprises an analog control circuit including a voltage reference circuit 420, a timing circuit 430, and a gate drive circuit 440. The voltage reference circuit 420 includes a pass-transistor circuit 460 and a snap-on circuit 470, and operates to generate a reference voltage $V_{REF}$ (e.g., approximately 14.4 volts) from the rectified voltage $V_{RECT}$. The timing circuit 430 receives the reference voltage $V_{REF}$ and generates a timing voltage $V_{TIM}$, which is representative of the target intensity $L_{TRGT}$ of the LED light source 104. The gate drive circuit 440 generates a gate voltage $V_G$, which is coupled to the gates of the FETs Q210A, Q210B via the gate coupling circuit 250 for simultaneously rendering the FETs conductive and non-conductive. According to the fourth embodiment of the present invention, the phase-control voltage $V_{PC}$ generated by the dimmer switch 400 comprises a reverse phase-control voltage. Accordingly, the gate drive circuit 440 operates to render the FETs Q210A, Q210B conductive at the beginning of each half cycle, and non-conductive at some time during each half cycle in response to the timing voltage $V_{TIM}$.

Figure 10:
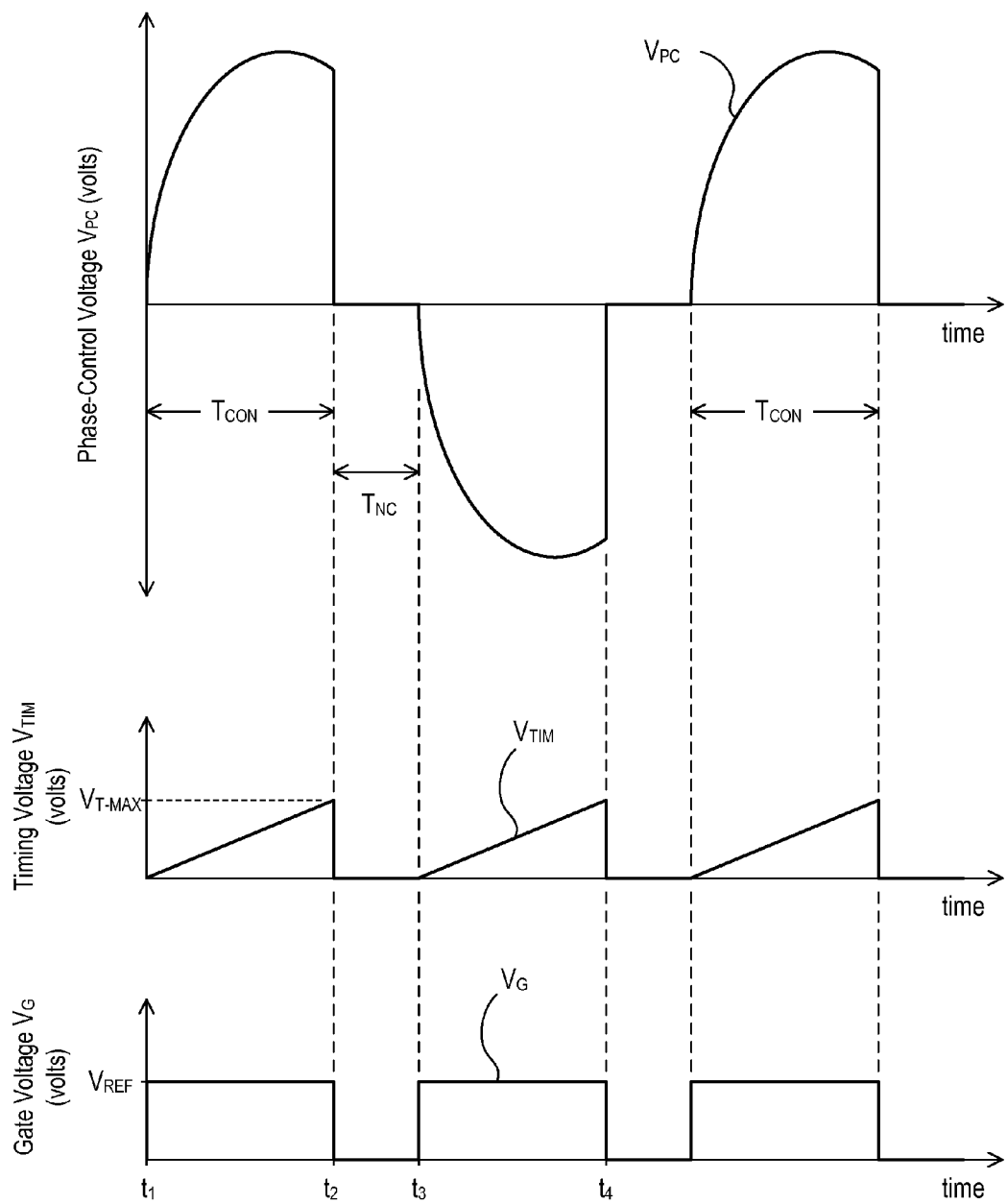
FIG. 10 is a simplified timing diagram showing examples of waveforms illustrating the operation of the dimmer switch of FIG. 9 according to the fourth embodiment of the present invention.

FIG. 10 is a simplified timing diagram showing examples of the phase-control voltage $V_{PC}$ generated by the dimmer switch 400, the timing voltage $V_{TIM}$, and the gate voltage $V_G$ for driving the FETs Q210A, Q210B according to the fourth embodiment of the present invention. The phase-control voltage $V_{PC}$ has a magnitude equal to approximately the magnitude of the AC line voltage $V_{AC}$ of the AC power source 105 at the beginning of each half cycle during a conduction time $T_{CON}$, and has a magnitude of approximately zero volts during the rest of the half cycle, i.e., during a non-conduction time $T_{NC}$. To generate the phase-control voltage $V_{PC}$, the gate drive circuit 440 drives the gate voltage $V_G$ high towards the reference voltage $V_{REF}$ at the beginning of each half cycle, such that the FETs Q210A, Q210B are rendered conductive (as shown at time $t_1$ in FIG. 10). At this time, the timing circuit 430 begins generating the timing voltage $V_{TIM}$, which comprises a ramp voltage that increases in magnitude with respect to time at a rate representative of the target intensity $L_{TRGT}$ of the LED light source 104 (i.e., in response to the intensity adjustment actuator 118). When the magnitude of the timing voltage $V_{TIM}$ reaches a maximum timing voltage threshold $V_{T-MAX}$ (e.g., approximately 7.5 volts), the gate drive circuit 440 renders the FETs Q210A, Q210B non-conductive (as shown at time $t_2$ in FIG. 10). The rate of the timing voltage $V_{TIM}$ is inversely proportional to the target intensity $L_{TRGT}$, i.e., the rate of the timing voltage $V_{TIM}$ increases as the target intensity $L_{TRGT}$ decreases, and decreases as the target intensity $L_{TRGT}$ increases. After the FETs Q210A, Q210B are rendered non-conductive, the gate drive circuit 440 will render the FETs conductive once again at the beginning of the next half cycle (as shown at time $t_3$ in FIG. 10).

Figure 11:
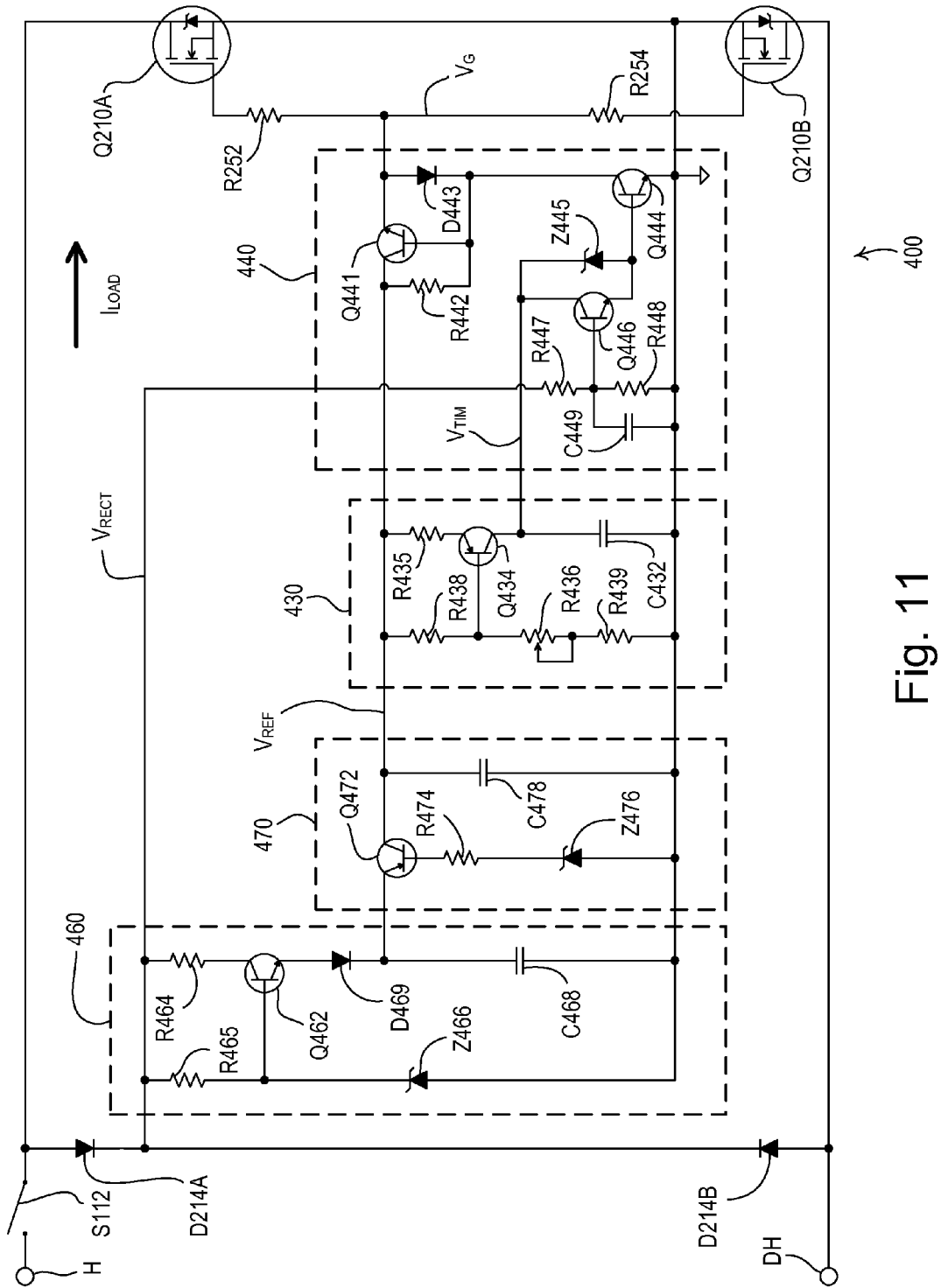
FIG. 11 is a simplified schematic diagram of the dimmer switch of FIG. 9 according to the fourth embodiment of the present invention.

FIG. 11 is a simplified schematic diagram of the dimmer switch 400 according to the fourth embodiment of the present invention. As shown in FIG. 11, the pass-transistor circuit 460 comprises an NPN bipolar junction transistor Q462 having a collector coupled to receive the rectifier voltage $V_{RECT}$ through a resistor R464 (e.g., having a resistance of approximately 180 Ω). The base of the transistor Q462 is coupled to the rectifier voltage $V_{RECT}$ through a resistor R465 (e.g., having a resistance of approximately 470 kΩ), and to circuit common through a zener diode Z466 (e.g., having a break-over voltage of approximately 15 volts). The pass-transistor circuit 460 further comprises a storage capacitor C468, which is able to charge through the transistor Q462 and a diode D469 to a voltage equal to approximately the break-over voltage of the zener diode Z466 minus the base-emitter drop of the transistor Q462 and the forward drop of the diode D469. The storage capacitor C468 has, for example, a capacitance of approximately 22 µF, and operates to maintain the reference voltage $V_{REF}$ at an appropriate magnitude (e.g., at least approximately 12 volts) to control the FETs Q210A, Q210B to be conductive (i.e., when there is approximately zero volts generated across the dimmer switch 100) as will be described in greater detail below.

The snap-on circuit 470 is coupled to the storage capacitor Q468 and comprises a PNP bipolar junction transistor Q472. The base of the transistor Q472 is coupled to circuit common through the series combination of a resistor R474 (e.g., having a resistance of approximately 22 kΩ) and a zener diode Z476 (e.g., having a break-over voltage of approximately 12 volts). The reference voltage $V_{REF}$ is generated across a capacitor C478, which is coupled between the collector of the transistor Q472 and circuit common and has, for example, a capacitance of approximately 0.1 µF. The snap-on circuit 470 operates such that the reference voltage $V_{REF}$ is only provided across the capacitor C478 when the magnitude of the voltage across the storage capacitor C468 of the pass-transistor circuit 460 exceeds the break-over voltage of the zener diode Z476 plus the emitter-base drop of the transistor Q472.

The timing circuit 430 receives the reference voltage $V_{REF}$ and generates the timing voltage $V_{TIM}$ across a timing capacitor C432 (e.g., having a capacitance of approximately 10 nF). The timing circuit 430 includes a constant current source circuit for charging the capacitor C432 at a constant rate to generate the timing voltage $V_{TIM}$. The constant current source circuit comprises a PNP bipolar junction transistor Q434 having an emitter coupled to the reference voltage $V_{REF}$ via a resistor R435 (e.g. having a resistance of approximately 180 kΩ). A voltage divider circuit comprising a potentiometer R436 and two resistors R438, R439 is coupled between the reference voltage $V_{REF}$ and circuit common. For example, the potentiometer R436 may have a resistance ranging from approximately 0 to 500 kΩ, while the resistors R438, R439 may have resistances of approximately 100 kΩ and 82 kΩ, respectively. The junction of the potentiometer R436 and the resistor R438 is coupled to the base of the transistor Q434. The resistance of the potentiometer R436 varies in response to the intensity adjustment actuator 118 of the dimmer switch 100, such that the magnitude of the voltage at the base of the transistor Q434 is representative of the target intensity $L_{TRGT}$. When the potentiometer R436 is not presently being adjusted (i.e., is in a steady state condition), a constant voltage is generated across the resistor R435 and the emitter-base junction of the transistor Q434, such that the transistor Q434 conducts a constant current (having a magnitude dependent upon the magnitude of the voltage at the base of the transistor Q434). Accordingly, the capacitor C432 charges at a rate dependent upon the target intensity $L_{TRGT}$ thus generating the timing voltage $V_{TIM}$ (as shown in FIG. 10).

The gate drive circuit 440 renders the FETs Q210A, Q210B conductive at the beginning of each half cycle, and non-conductive at some time during each half cycle in response to the timing voltage $V_{TIM}$ from the timing circuit 430. The gate drive circuit 440 comprises an NPN bipolar junction transistor Q441 and a resistor R442, which is coupled between the collector and base of the transistor Q441 and has a resistance of, for example, approximately 270 kΩ. A diode D443 is coupled between the emitter and the base of the transistor Q441. At the beginning of each half cycle, the resistor R442 conducts current into the base of the transistor Q441. The transistor Q441 is thus rendered conductive and the reference voltage $V_{REF}$ is coupled to the gates of the FETs Q210A, Q210B via the respective gate resistors R252, R254 to thus render the FETs conductive. As previously mentioned, the storage capacitor C468 of the voltage reference circuit 420 maintains the reference voltage $V_{REF}$ at an appropriate magnitude (i.e., at least approximately 14.4 volts) to maintain the FETs Q210A, Q210B conductive and the voltage developed across the dimmer switch 400 is approximately zero volts.

The timing voltage $V_{TIM}$ is coupled to the base of an NPN bipolar junction transistor Q444 through a zener diode Z445 (e.g., having a break-over voltage of approximately 6.8 volts). When the magnitude of the timing voltage $V_{TIM}$ exceeds approximately the break-over voltage of the zener diode Z445 plus the base-emitter drop of the transistor Q444 (i.e., the maximum timing voltage threshold $V_{T-MAX}$), the transistor Q444 is rendered conductive. Accordingly, the gate voltage $V_G$ is pulled down towards circuit common through the diode D443 thus rendering the FETs Q210A, Q210B non-conductive.

The gate drive circuit 440 also comprises an NPN bipolar junction transistor Q446 coupled across the zener diode Z445. The base of the transistor Q446 is coupled to the junction of two series-connected resistors R447, R448 (e.g., having resistances of approximately 200 kΩ and 10 kΩ respectively). The resistors R447, R448 form a voltage divider coupled between the rectified voltage $V_{RECT}$ and circuit common. The base of the transistor Q446 is also coupled to circuit common via a capacitor C449 (e.g., having a capacitance of approximately 10 nF). When the FETs Q210A, Q210B are rendered non-conductive (in response to the timing voltage $V_{TIM}$ exceeding the maximum timing voltage threshold $V_{T-MAX}$), the voltage developed across the dimmer switch 400 increases to approximately the magnitude of the AC line voltage $V_{AC}$ of the AC power source 105. As a result, the voltage at the base of the transistor Q446 increases such that the transistor is rendered conductive. Accordingly, the magnitude of the timing voltage $V_{TIM}$ is controlled to approximately zero volts and the transistor Q444 is maintained conductive (thus keeping the FETs Q210A, Q210B non-conductive) until the end of the present half cycle.

Near the end of the half cycle, the magnitude of the AC line voltage $V_{AC}$ of the AC power source 105 as well as the magnitude of voltage at the base of the transistor Q446 decrease such that the transistor Q446 is rendered non-conductive. Accordingly, the transistor Q444 is rendered non-conductive and the reference voltage $V_{REF}$ is coupled to the gates of the FETs Q210A, Q210B through the transistor Q441 and the respective gate resistors R252, R254, thus rendering the FETs conductive. In addition, when the transistor Q446 is non-conductive, the timing voltage $V_{TIM}$ of the timing circuit 430 may once again begin increasing in magnitude with respect to time at the rate dependent upon the target intensity $L_{TRGT}$ (as shown in FIG. 10).

Figure 12:
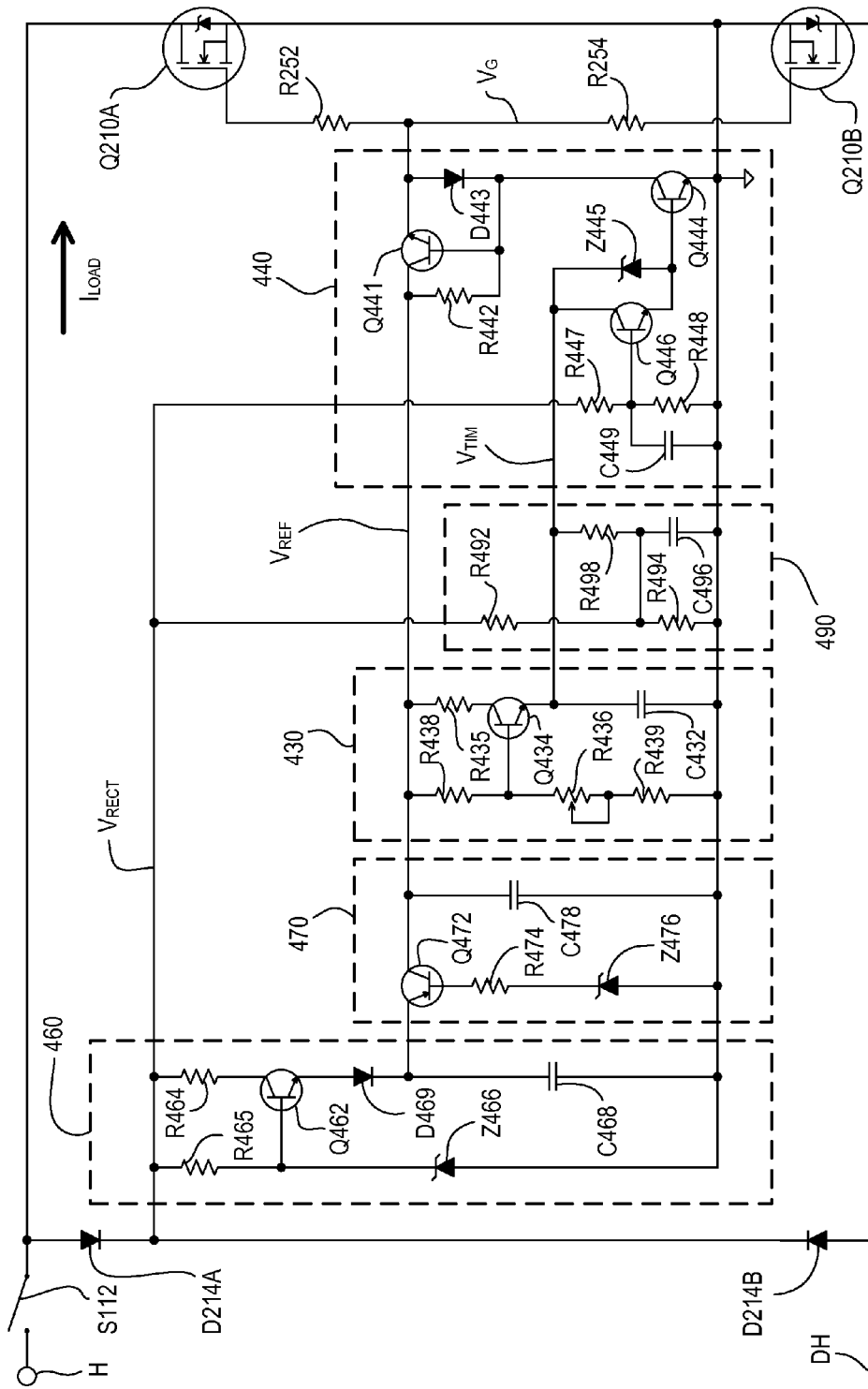
FIG. 12 is a simplified schematic diagram of a dimmer switch according to an alternate embodiment of the present invention.

FIG. 12 is a simplified schematic diagram of a dimmer switch 480 according to an alternate embodiment of the present invention. The dimmer switch 480 of FIG. 12 is very similar to the dimmer switch 400 of the fourth embodiment. However, the dimmer switch 480 of FIG. 12 comprises a voltage compensation circuit 490, which receives the rectified voltage $V_{RECT}$ and adjusts the timing voltage $V_{TIM}$ to account for changes and fluctuations in the AC line voltage $V_{AC}$ of the AC power source 105 to avoid flickering of the intensity of the LED light source 104. The voltage compensation circuit 490 comprises two resistors R492, R494, which are coupled in series between the rectified voltage $V_{RECT}$ and circuit common, and have, for example, resistances of approximately 1 MΩ and 98 kΩ, respectively. A capacitor C496 is coupled between the junction of the resistors R492, R494 and circuit common, and has, for example, a capacitance of approximately 0.22 µF. The capacitor C496 is coupled to the timing voltage $V_{TIM}$ through a resistor R498 (e.g., having a resistance of approximately 560 kΩ).

The voltage produced across the capacitor C496 is proportional to the magnitude of the AC line voltage $V_{AC}$ of the AC power source 105 when the FETs Q210A, Q210B are non-conductive and the timing voltage $V_{TIM}$ is increasing in magnitude with respect to time. When there are no changes or fluctuations in the magnitude of the AC line voltage $V_{AC}$ of the AC power source 105, the capacitor C496 charges to a steady-state voltage. However, if the magnitude of the AC line voltage $V_{AC}$ changes while the FETs Q210A, Q210B are non-conductive during a half cycle (e.g., between times $t_2$ and $t_3$ in FIG. 10), the magnitude of the voltage across the capacitor C496 will also change, thus resulting in a change in the timing voltage $V_{TIM}$ when the FETs are conductive during the next half cycle (e.g., between times $t_3$ and $t_4$). For example, if the magnitude of the AC line voltage $V_{AC}$ (and thus the magnitude of the voltage across the capacitor C496) increases while the FETs Q210A, Q210B are non-conductive during a half cycle, the magnitude of the timing voltage $V_{TIM}$ will be greater while the FETs are conductive during the next half cycle, thus causing the FETs to be rendered non-conductive earlier in the next half cycle.

Figure 13:
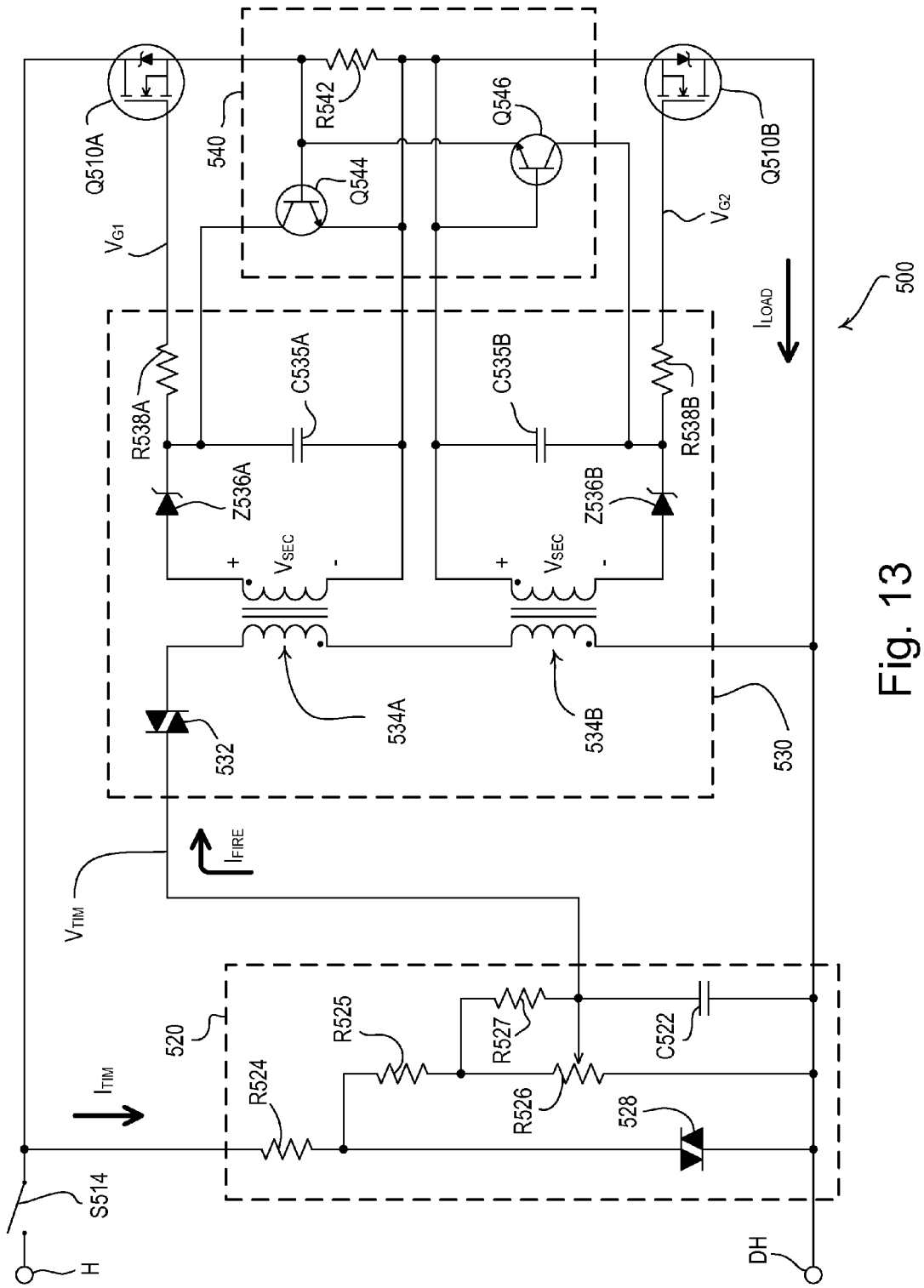
FIG. 13 is a simplified schematic diagram of a dimmer switch according to a fifth embodiment of the present invention.

FIG. 13 is a simplified schematic diagram of a dimmer switch 500 according to a fifth embodiment of the present invention. The dimmer switch 500 comprises a mechanical air-gap switch S514 and two FETs Q510A, Q510B coupled in anti-series connection between the hot terminal H and the dimmed hot terminal DH for generating the phase-control voltage $V_{PC}$. The dimmer switch 500 comprises an analog control circuit (e.g., a timing circuit 520) for generating a timing voltage $V_{TIM}$ representative of the target intensity $L_{TRGT}$ of the LED light source 104, and a gate drive circuit 530 for rendering the FETs Q510A, Q510B conductive and non-conductive in response to the timing voltage $V_{TIM}$ to thus generate the phase-control voltage $V_{PC}$. According to the fifth embodiment of the present invention, the gate drive circuit 530 is operable to generate two gate voltages $V_{G1}$, $V_{G2}$ for independently controlling the respective FETs Q510A, Q510B on a complementary basis. The FETs Q510A, Q510B are rendered conductive when the magnitudes of the respective gate voltages $V_{G1}$, $V_{G2}$ are controlled to a nominal gate voltage $V_N$ (e.g., approximately 9 V) and are rendered non-conductive when the magnitudes of the respective gate voltages $V_{G1}$, $V_{G2}$ are controlled to approximately zero volts. The dimmer switch 500 further comprises an overcurrent protection circuit 540 for rendering the FETs Q510A, Q510B non-conductive in the event of an overcurrent condition in the FETs.

Figure 14:
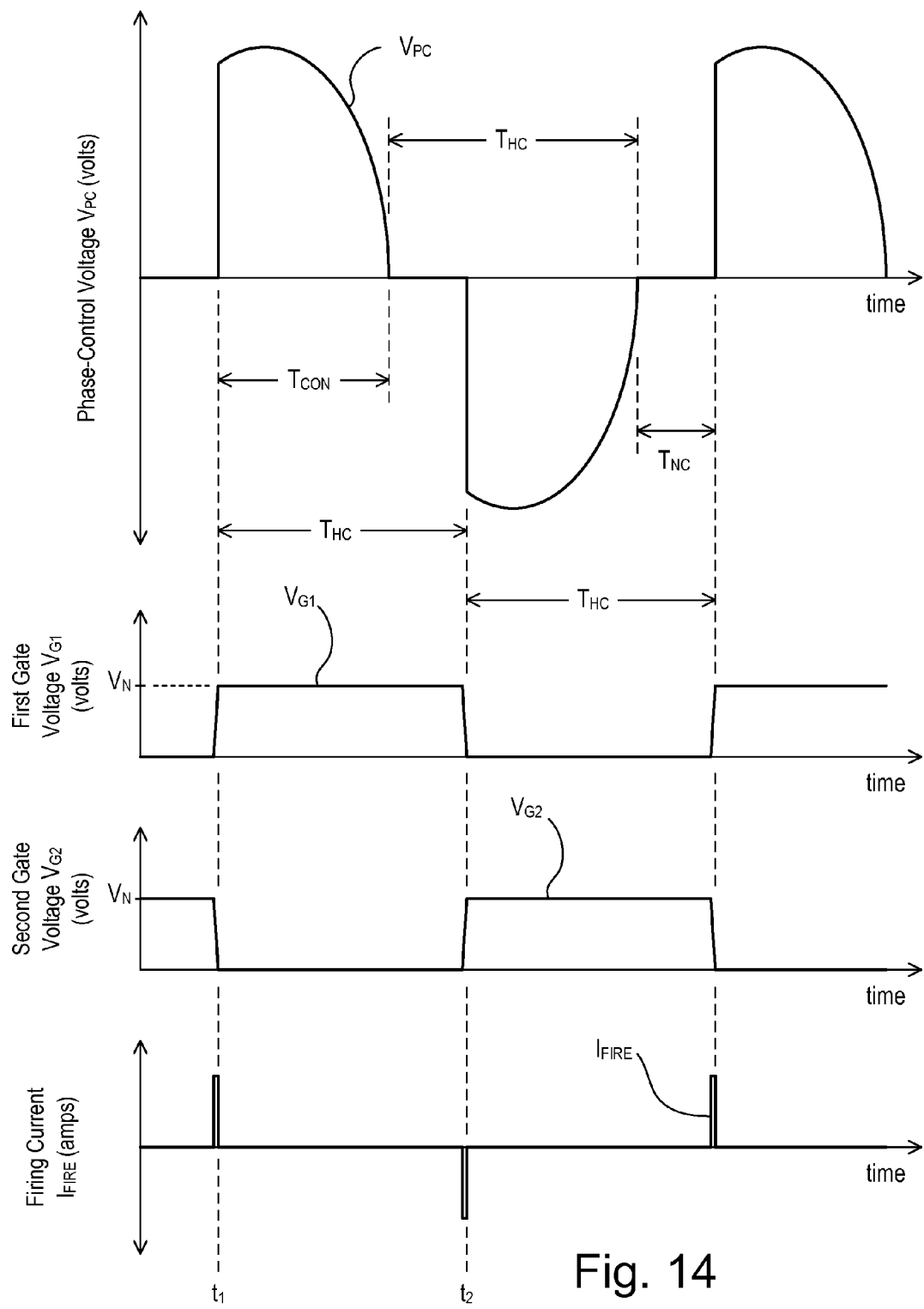
FIG. 14 is a simplified timing diagram showing examples of waveforms illustrating the operation of the dimmer switch of FIG. 13 according to the fifth embodiment of the present invention.

FIG. 14 is a simplified timing diagram showing examples of the phase-control voltage $V_{PC}$ generated by the dimmer switch 500 and the gate voltages $V_{G1}$, $V_{G2}$ for driving the FETs Q510A, Q510B, respectively. According to the fifth embodiment of the present invention, the phase-control voltage $V_{PC}$ comprises a forward phase-control voltage. During the positive half cycles, the first FET Q510A is rendered conductive and the second FET Q510B is rendered non-conductive when the first gate voltage $V_{G1}$ increases from approximately zero volts to the nominal gate voltage $V_N$ (as shown at time $t_1$), and the second gate voltage $V_{G2}$ decreases from the nominal gate voltage $V_N$ to approximately zero volts. At this time, the dimmer switch 500 conducts the load current $I_{LOAD}$ to the LED driver 102 through the first FET Q510A and the body diode of the second FET Q510B. At the beginning of the negative half cycles, the first FET Q510 remains conductive. However, since the second FET Q510B is non-conductive and the body diode of the second FET Q510B is reversed-biased, the dimmer switch 500 does not conduct the load current $I_{LOAD}$ at this time.

During the negative half cycles, the first FET Q510A is rendered non-conductive and the second FET Q510B is rendered conductive when the first gate voltage $V_{G1}$ decreases from the nominal gate voltage $V_N$ to approximately zero volts and the second gate voltage $V_{G2}$ increases from approximately zero volts to the nominal gate voltage $V_N$ (as shown at time $t_2$). At this time, the dimmer switch 500 conducts the load current $I_{LOAD}$ to the LED driver 102 through the second FET Q510B and the body diode of the first FET Q510A. At the beginning of the positive half cycles, the second FET Q510B remains conductive, the first FET Q510A is non-conductive, and the body diode of the first FET Q510A is reversed-biased at this time, such that the dimmer switch 500 does not conduct the load current $_{LOAD}$ until the first FET Q510A is rendered conductive.

The timing circuit 520 is coupled in series between the hot terminal H and the dimmed hot terminal DH and conducts a timing current $I_{TIM}$ (i.e., a control current) through the LED driver 102 in order to generate the timing voltage $V_{TIM}$ across a capacitor C522 (e.g., having a capacitance of approximately 0.1 μF). The capacitor C522 is operable to charge from the AC power source 105 through resistors R524, R525 (e.g., having resistances of approximately 27 kΩ and 10 kΩ, respectively) and a potentiometer R526. The resistance of the potentiometer R526 may range from, for example, approximately 0 kΩ to 300 kΩ, and may be controlled by a user of the dimmer switch 500 (e.g., by actuating the slider control) to adjust the target intensity $L_{TRGT}$ of the LED light source 104. A calibration resistor R527 is coupled to potentiometer R526 for calibrating the range of the potentiometer, and has a resistance of, for example, approximately 300 kΩ. Since the capacitor C522 charges through the potentiometer R526, the rate at which the capacitor C522 charges and thus the magnitude of the timing voltage $V_{TIM}$ are representative of the target intensity $L_{TRGT}$ of the LED light source 104.

The drive circuit 530 comprises a diac 532 (e.g., having a break-over voltage $V_{BR}$ of approximately 32 volts) and two pulse transformers 534A, 534B. The diac 532 is coupled in series with the primary windings of the two pulse transformers 534A, 534B. The secondary windings of the pulse transformers 534A, 534B are coupled to respective capacitors C535A, C535B via respective zener diodes Z536A, Z536B (which each have a break-over voltage approximately equal to the nominal gate voltage $V_N$, i.e., approximately 9 V). The capacitors C535A, C535B are coupled to the gates of the FETs Q510A, Q510B via gate resistors R538A, R538B, respectively (e.g., having resistances of approximately 47 kΩ). The gate resistors R538A, R538B may alternatively have different resistances in order to change the duration of the switching times of the FETs Q510A, Q510B as is well known in the art.

When the magnitude of the timing voltage $V_{TIM}$ exceeds approximately the break-over voltage $V_{BR}$ of the diac 532, the diac conducts a pulse of current (i.e., a firing current $I_{FIRE}$ as shown in FIG. 13) through the primary windings of the pulse transformers 534A, 534B causing secondary voltages $V_{SEC}$ (e.g., approximately 9V) to be generated across the secondary windings of the pulse transformers. During the positive half cycles, the capacitor C535A charges from the secondary winding of the first pulse transformer 534A through the zener diode Z536A to approximately the nominal gate voltage $V_N$ (i.e., approximately 9 volts). Accordingly, the first gate voltage $V_{G1}$ is driven high from approximately zero volts to the nominal gate voltage $V_N$ rendering the first FET Q510A conductive (as shown at time $t_1$ in FIG. 14). At the beginning of the negative half cycles, the first FET Q510A is conductive, while the second FET Q510B is non-conductive. Since the body diode of the second FET Q510B is reversed biased at this time, the dimmer switch 500 does not conduct the load current $I_{LOAD}$.

During the negative half cycles, the firing current $I_{FIRE}$ has a negative magnitude, thus causing the secondary voltages $V_{SEC}$ across the secondary windings of the pulse transformers 534A, 534B to also have negative magnitudes. Accordingly, the zener diode Z536A is reverse-biased during the negative half cycles, causing the capacitor C535A to discharge through the zener diode Z536A, such that the voltage across the capacitor C535A is driven to approximately zero volts. As a result, the first gate voltage $V_{G1}$ is driven low from the nominal gate voltage $V_N$ to approximately zero volts rendering the first FET Q510A non-conductive (as shown at time $t_2$ in FIG. 14). In addition, the zener diode Z536B coupled to the secondary winding of the second pulse transformer 534B is forward-biased in the negative half cycles, such that the capacitor C535B charges to approximately the nominal gate voltage $V_N$ and the second FET Q510B is rendered conductive during the negative half cycles (as shown at time $t_2$ in FIG. 14). Accordingly, the FETs Q510A, Q510B are driven in a complementary manner, such that—at all times—at least one FET is conductive, while the other FET is non-conductive. As a result, the FETs Q510A, Q510B are driven to be conductive for approximately the period $T_{HC}$ of a half cycle and non-conductive for the period $T_{HC}$ of a half cycle.

The timing circuit 520 also comprises a diac 528 (e.g., having a break-over voltage of approximately 64V) coupled to the potentiometer R526. The diac 528 provides voltage compensation by adjusting the voltage provided to the potentiometer R526 to compensate for variations in the AC line voltage $V_{AC}$ provided by the AC power source 105. The diac 528 has a negative impedance transfer function, such that the voltage across the diac increases as the current through the diac decreases. Thus, as the voltage across the dimmer switch 500 (i.e., between the hot terminal H and the dimmed hot terminal DH) decreases, the current through the resistor R524 and the diac 528 decreases. As a result, the voltage across the diac 528 increases, thus causing the current flowing through the potentiometer R526 to increase and the firing capacitor C522 to charge at a faster rate. This results in an increased conduction time $T_{CON}$ of the FETs Q510A, Q510B during the present half cycle to compensate for the decreased voltage across the dimmer switch 500, thereby maintaining the intensity of the LED light source 104 constant.

The drive circuit 530 is characterized as having inherent shorted-FET protection. In the event that one of the FETs Q510A, Q510B fails shorted, the drive circuit 530 is operable to drive the other, non-shorted FET into full conduction, such that the load current $I_{LOAD}$ is not asymmetric. Asymmetric current can cause some types of lighting loads to overheat. For example, if the second FET Q510B fails shorted, the full AC waveform will be provided to the LED driver 102 during the negative half cycles. Since there will be approximately zero volts produced across the dimmer switch 500 during the negative half cycles when second FET Q510B is shorted, the capacitor C522 of the timing circuit 520 will not charge, the diac 532 of the drive circuit 330 will not conduct the pulse of the firing current $I_{FIRE}$, and the voltage across the capacitor C535A will not be driven to zero volts to render the first FET Q510A non-conductive during the negative half cycles. Accordingly, the first FET Q510A will remain conductive during both half cycles and the load current $I_{LOAD}$ will be substantially symmetric. The second FET Q510B is controlled to be conductive in a similar manner if the first FET Q510A has failed shorted.

The overcurrent protection circuit 540 comprises a sense resistor R542 (e.g., having a resistance of approximately 0.015Ω). The sense resistor R542 is coupled between the sources of the FETs Q510A, Q510B, such that a voltage representative of the magnitude of the load current $I_{LOAD}$ is generated across the sense resistor. The voltage generated across the sense resistor R542 is provided to the base of a first NPN bipolar junction transistor (BJT) Q544. The first transistor Q544 is coupled across the capacitor C535A and operates to protect the first FET Q510A in the event of an overcurrent condition during the positive half cycles. When the magnitude of the load current $I_{LOAD}$ exceeds a predetermined current limit (e.g., approximately 46.6 amps) such that the voltage generated across the sense resistor R542 exceeds the rated base-emitter voltage (e.g., approximately 0.7 volts) of the first transistor Q544, the first transistor is rendered conductive. Accordingly, the first transistor Q544 pulls the first gate voltage $V_{G1}$ at the gate of the first FET Q510A down towards zero volts, thus rendering the first FET non-conductive. The overcurrent protection circuit 540 further comprises a second NPN bipolar junction transistor Q546, which is coupled across the capacitor C535B and operates to protect the second FET Q510B during the negative half cycles. When the magnitude of the load current $I_{LOAD}$ exceeds the predetermined current limit, the second transistor Q546 is rendered conductive, thus pulling the second gate voltage $V_{G2}$ at the gate of the second FET Q510B down towards zero volts and rendering the second FET non-conductive.

Figure 15:
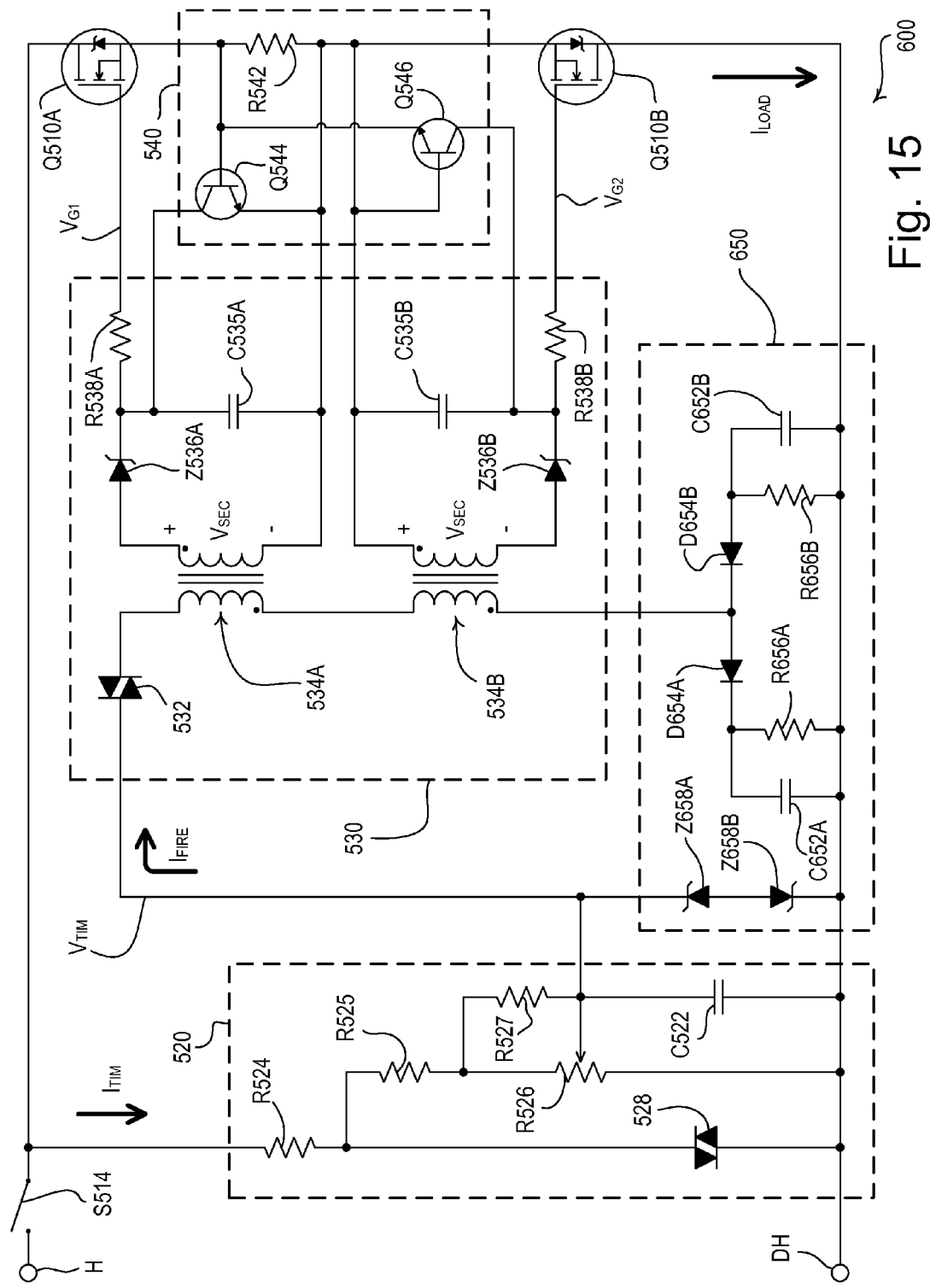
FIG. 15 is a simplified schematic diagram of a dimmer switch according to a sixth embodiment of the present invention.

FIG. 15 is a simplified schematic diagram of a dimmer switch 600 according to a sixth embodiment of the present invention. The dimmer switch 600 comprises a drive limit circuit 650, which is coupled in series with the diac 532 and the primary windings of the two pulse transformers 534A, 534B of the drive circuit 530. The drive limit circuit 650 operates to limit the number of times that the drive circuit 530 attempts to render the FETs Q510A, Q510B conductive during a specific half cycle. For example, if the overcurrent protection circuit 540 renders one of the FETs Q510A, Q510B non-conductive, the drive limit circuit 650 prevents the drive circuit 530 from attempting to render the respective FET conductive again during the present half cycle.

When the diac 532 fires each half cycle, the drive limit circuit 650 conducts the firing current $I_{FIRE}$ and generates an offset voltage $V_{OFFSET}$ across a capacitor C652A during the positive half cycles and a capacitor C652B during the negative half cycles. The capacitor C452A charges through a diode D654A during the positive half cycles, and the capacitor C452B charges through a diode D654B during the negative half cycles. For example, the capacitors C652A, C652B may have capacitances of approximately 0.1 µF. Discharge resistors R656A, R656B are coupled in parallel with the capacitors C652A, C652B, respectively, and each have a resistance of, for example, approximately 33 kΩ. The drive limit circuit 450 further comprises two zener diodes Z658A, Z658B coupled in anti-series connection and each having the same break-over voltage $V_Z$ (e.g., approximately 40V). The zener diodes Z658A, Z658B are coupled to the timing circuit 520 to limit the magnitude of the timing voltage $V_{TIM}$ to a clamp voltage $V_{CLAMP}$, i.e., approximately the break-over voltage $V_Z$, in both half cycles.

At the beginning of a positive half cycle, the capacitor C652A of the drive limit circuit 540 has no charge, and thus, no voltage is developed across the capacitor. The timing voltage signal $V_{TIM}$ increases until the magnitude of the timing voltage $V_{TIM}$ exceeds approximately the break-over voltage $V_{BR}$ of the diac 532. When the diac 532 fires, the diode D654A and the capacitor C652A conduct pulse of the firing current $I_{FIRE}$ and the offset voltage $V_{OFFSET}$ (e.g., approximately 12 volts) is developed across the capacitor C652A. After the diac 532 has finished conducting the firing current $I_{FIRE}$, the voltage across the capacitor C522 decreases by approximately a break-back voltage (e.g., approximately 10 volts) of the diac 532 to a predetermined voltage $V_P$ (e.g., approximately 22 volts). If the overcurrent protection circuit 540 renders one of the FETs Q510A, Q510B non-conductive, the timing voltage signal $V_{TIM}$ will begin to increase again. The magnitude of the timing voltage $V_{TIM}$ must exceed approximately the break-over voltage $V_{BR}$ of the diac 532 plus the offset voltage $V_{OFFSET}$ across the capacitor C652A (i.e., approximately 44 volts) in order for the diac 532 to conduct the pulse of the firing current $V_{FIRE}$ once again. However, because the zener diode Z658A limits the timing voltage $V_{TIM}$ to the break-over voltage $V_Z$ (i.e., approximately 40 volts), the timing voltage $V_{TIM}$ is prevented from exceeding the voltage threshold $V_{TH}$. Accordingly, the drive circuit 530 is prevented from repeatedly attempting to render the FETs Q510A, Q510B conductive during each half cycle in the event of an overcurrent condition.

The timing voltage $V_{TIM}$ is prevented from exceeding the voltage threshold $V_{TH}$ until the voltage ΔV across the capacitor C652A decays to approximately the break-over voltage $V_Z$ of the zener diode Z658A minus the break-over voltage $V_{BR}$ of the diac 532. The capacitor C652A discharges slowly through the discharge resistor R656A, such that the time required for the voltage ΔV across the capacitor C652A to decay to approximately the break-over voltage $V_Z$ of the zener diode Z658A minus the break-over voltage $V_{BR}$ of the diac 532 is long enough such that the drive circuit 530 only attempts to render the FETs Q510A, Q510B conductive once during each half cycle. The voltage across the capacitor C652A decays to substantially zero volts during the negative half cycle such that the voltage across the capacitor C652A is substantially zero volts at the beginning of the next positive half cycle. The capacitor C652B, the diode D654B, the discharge resistor R656B, and the zener diode Z658B of the drive limit circuit 650 operate in a similar fashion during the negative half cycles. An example of the drive limit circuit 650 is described in greater detail in commonly-assigned U.S. Pat. No. 7,570,031, issued Aug. 4, 2009, entitled METHOD AND APPARATUS FOR PREVENTING MULTIPLE ATTEMPTED FIRINGS OF A SEMICONDUCTOR SWITCH IN A LOAD CONTROL DEVICE, the entire disclosure of which is hereby incorporated by reference.

Figure 16:
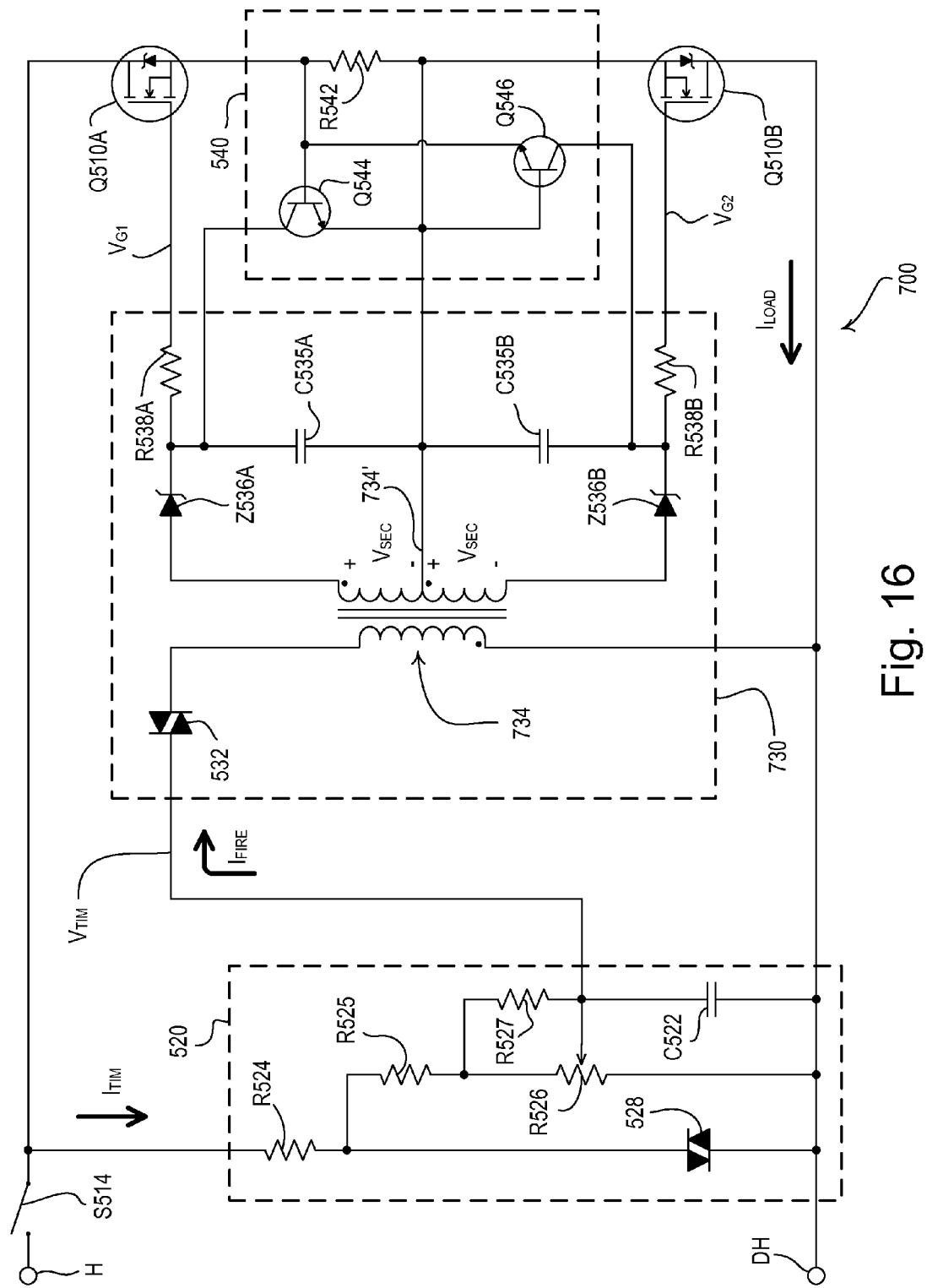
FIG. 16 is a simplified schematic diagram of a dimmer switch according to a seventh embodiment of the present invention.

FIG. 16 is a simplified schematic diagram of a dimmer switch 700 according to a seventh embodiment of the present invention. The dimmer switch 700 comprises a drive circuit 730 that includes a single pulse transformer 734. The pulse transformer 734 has a single primary winding and secondary winding having a tap connection 734'. The diac 532 is coupled in series with the single primary winding of the pulse transformer 734. The series combination of the zener diode Z536A and the capacitor C535A is coupled between one end of the secondary winding and the tap connection 734' of the pulse transformer 734. The series combination of the diode Z536B and the capacitor C535B is coupled between the other end of the secondary winding and the tap connection 734' of the pulse transformer 734. The drive circuit 730 of the seventh embodiment operates to render the FETs Q510A, Q510B conductive and non-conductive in the same manner as the drive circuit 530 of the fifth embodiment.

Figure 17:
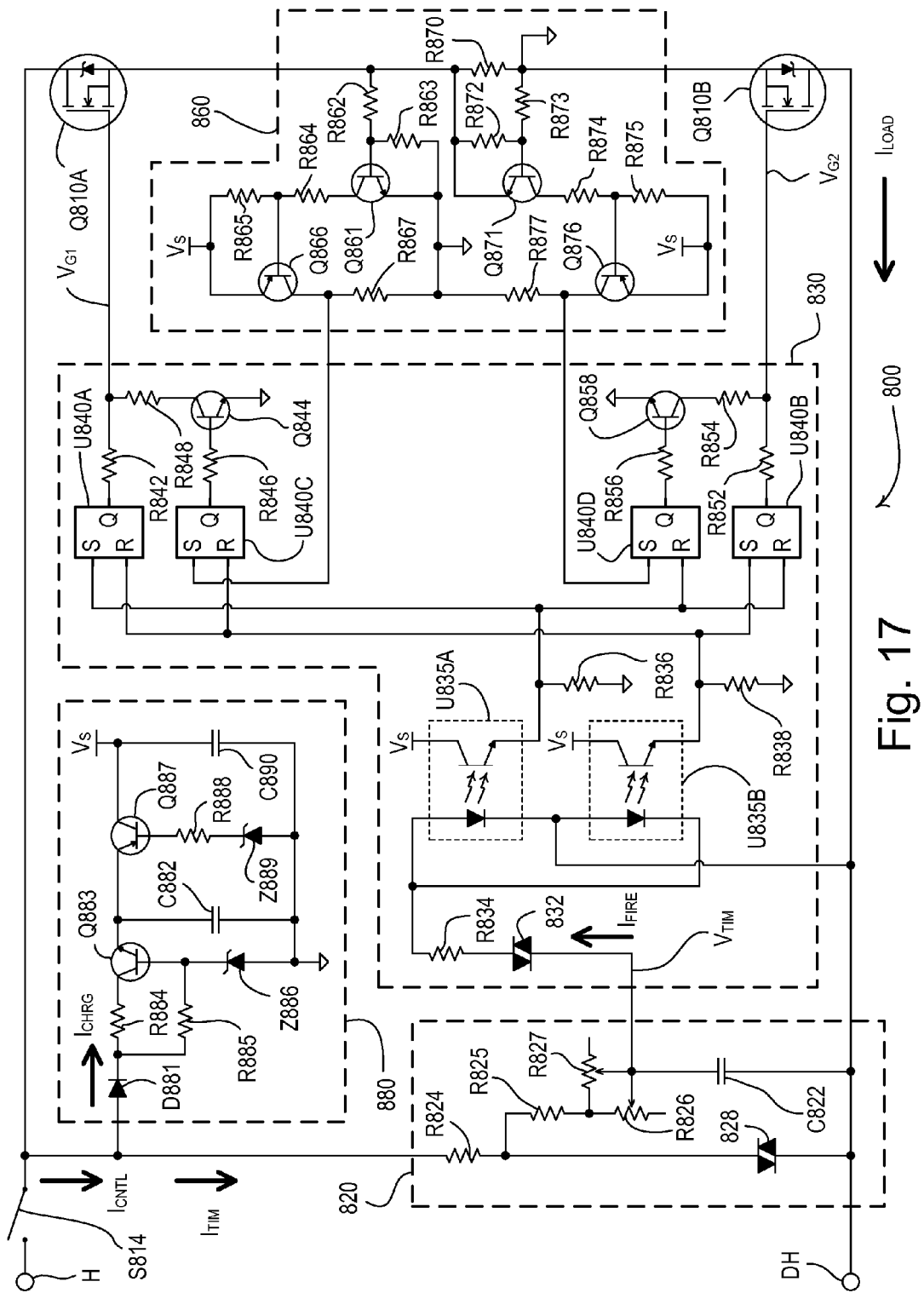
FIG. 17 is a simplified schematic diagram of a dimmer switch according to an eighth embodiment of the present invention.

FIG. 17 is a simplified schematic diagram of a dimmer switch 800 according to an eighth embodiment of the present invention. The dimmer switch 800 comprises a mechanical air-gap switch S814 and two FETs Q810A, Q810B coupled in anti-series connection between the hot terminal H and the dimmed hot terminal DH for control of the amount of power delivered to the connected LED driver 102. As in the fifth, sixth, and seventh embodiments, the FETs Q810A, Q810B have control inputs (i.e., gates) that receive respective gate voltages $V_{G1}$, $V_{G2}$ for rendering the FETs conductive and non-conductive. The LED light source 104 is off when the switch S814 is open, and is on when the switch is closed. The dimmer switch 800 comprises a control circuit that includes a timing circuit 820 and a power supply 880 and is operable to conduct a control current $I_{CNTL}$ through the LED driver 102. The timing circuit 820 conducts a timing current $I_{TIM}$ in order to generate a timing voltage $V_{TIM}$ (as in the fifth embodiment). The dimmer switch 800 further comprises a drive circuit 830 for rendering the FETs 810A, Q810B conductive and non-conductive in response to the timing voltage $V_{TIM}$ and an overcurrent protection circuit 860 for rendering the FETs 810A, Q810B non-conductive in response to an overcurrent condition through the FETs.

The power supply 880 generates a DC supply voltage $V_S$ (e.g., approximately 14.4 volts) for powering the drive circuit 830 and the overcurrent protection circuit 860. The power supply 880 conducts a charging current $I_{CHRG}$ through the LED driver 102 when the dimmer switch 800 is not conducting the load current $I_{LOAD}$ to the LED driver and the magnitude of the voltage developed across the dimmer switch is approximately equal to the magnitude of the AC line voltage $V_{AC}$. The control current $I_{CNTL}$ conducted through the LED driver 102 is approximately equal to the sum of the timing current $I_{TIM}$ of the timing circuit 820 and the charging current $I_{CHRG}$ of the power supply 880.

The power supply 880 comprises a diode D881 coupled to the hot terminal H (via the switch S814), such that the power supply 880 only charges during the positive half cycles of the AC power source 105. The power supply 880 includes a pass-transistor circuit that operates to generate the supply voltage $V_S$ across a capacitor C882 (e.g., having a capacitance of approximately 10 µF). The pass-transistor circuit comprises an NPN bipolar junction transistor Q883, a resistor R884 (e.g., having a resistance of approximately 220 Ω), a resistor R885 (e.g., having a resistance of approximately 470 kΩ), and a zener diode Z886. The capacitor C882 is coupled to the emitter of the transistor Q883, such that the capacitor is able to charge through the transistor. The zener diode Z886 is coupled to the base of the transistor Q883 and has a break-over voltage of, for example, approximately 15V, such that the capacitor C882 is able to charge to a voltage equal to approximately the break-over voltage minus the base-emitter drop of the transistor.

The power supply 880 further comprises snap-on circuit including a PNP bipolar junction transistor Q887, a resistor R888 (e.g., having a resistance of approximately 22 kΩ), and a zener diode Z889. The resistor R888 and the zener diode Z889 are coupled in series with the base of the transistor Q887, and the collector of the transistor Q887 is coupled to a capacitor C890. The zener diode Z889 has a break-over voltage of, for example, approximately 12 V, such that the voltage across the capacitor C882 is coupled across the capacitor C890 when the magnitude of the voltage across the capacitor C882 exceeds approximately the break-over voltage of the zener diode Z889 plus the emitter-base drop of the transistor Q887. When the magnitude of the voltage across the capacitor C882 drops below approximately the break-over voltage of the zener diode Z889 plus the emitter-base drop of the transistor Q887, the voltage across the capacitor C882 is disconnected from the capacitor C890, such that the supply voltage $V_S$ will drop to approximately circuit common (i.e., approximately zero volts).

The timing circuit 820 conducts the timing current $I_{TIM}$ and generates the timing voltage $V_{TIM}$ across a capacitor C822 (e.g., having a capacitance of approximately 0.047 µF). The capacitor C822 charges from the AC power source 105 through resistors R824, R825 (e.g., having resistances of approximately 27 kΩ and 10 kΩ respectively) and a potentiometer R826 (e.g., having a resistance ranging from approximately 0 kΩ to 300 kΩ). A calibration potentiometer R827 is coupled across the potentiometer R826 and has, for example, a resistance ranging from approximately 0 to 500 kΩ. The timing circuit 820 further comprises a diac 828, which has a break-over voltage of, for example, approximately 64V, and operates to provide voltage compensation for the timing circuit (in a similar manner as the diac 528 of the timing circuit 520 of the fifth embodiment).

The drive circuit 830 generates the gate voltages $V_{G1}$, $V_{G2}$ for rendering the FETs Q810A, Q810B conductive and non-conductive on a complementary basis in response to the timing voltage $V_{TIM}$ of the timing circuit 820. The drive circuit 830 comprises a diac 832 (e.g., having a break-over voltage of approximately 32 volts), a resistor R834 (e.g., having a resistance of approximately 680 Ω), and two optocouplers U835A, U835B. When the magnitude of the timing voltage $V_{TIM}$ exceeds approximately the break-over voltage of the diac 832, the diac conducts a firing current $I_{FIRE}$ through the input photodiode of the first optocoupler U835A during the positive half cycles, and through the input photodiode of the second optocoupler U835B during the negative half cycles. Accordingly, the output phototransistor of the first optocoupler U835A is rendered conductive during the positive half cycles, and the output phototransistor of the second optocoupler U835B is rendered conductive during the negative half cycles. The output phototransistors of the optocouplers U835A, U835B are between the supply voltage $V_s$ and circuit common through respective resistors R836, R838, which each have resistances of, for example, approximately 4.7 kΩ.

The output phototransistors of the optocouplers U835A, U835B are also coupled to set-reset (SR) latches U840A, U840B, U840C, U840D, which operate to generate the gate voltages $V_{G1}$, $V_{G2}$ and to thus render the FETs Q810A, Q810B conductive and non-conductive on the complementary basis. For example, the SR latches U840A, U840B, U840C, U840D may be implemented as part of a single integrated circuit (IC), which may be powered by the supply voltage $V_S$. As shown in FIG. 17, the output phototransistor of the first optocoupler U835A is coupled to the set input of the first SR latch U840A and to the reset input of the second SR latch U840B. The output phototransistor of the second optocoupler U835B is coupled to the set input of the second SR latch U840B and to the reset input of the first SR latch U840A. The output of the first SR latch U840A is coupled to the gate of the first FET Q810A and the output of the second SR latch U840B is coupled to the gate of the second FET Q810B through respective resistors R842, R852, which each have a resistance of, for example, approximately 47 kΩ.

When the output phototransistor of the first optocoupler U835A is rendered conductive during the positive half cycles, the output of the first SR latch U840A is driven high towards the supply voltage $V_S$ (thus rendering the first FET Q810A conductive), while the output of the second SR latch U840B is driven low towards circuit common (thus rendering the second FET Q810B non-conductive). Similarly, when the output phototransistor of the second optocoupler U835B is rendered conductive during the negative half cycles, the output of the second SR latch U840B is driven high towards the supply voltage $V_S$ (thus rendering the second FET Q810B conductive), while the output of the first SR latch U840A is driven low towards circuit common (thus rendering the first FET Q810A non-conductive). Since the set input of the first SR latch U840A is coupled to the reset input of the second SR latch U840B, and the set input of the second SR latch is coupled to the reset input of the first SR latch, the FETs Q810A, Q810B are driven in a complementary manner (as in the fifth embodiment), such that one of the FETs is conductive, while the other FET is non-conductive.

The overcurrent protection circuit 860 is coupled to the set inputs of the third and fourth SR latches U840C, U840D for rendering the FETs Q810A, Q810B non-conductive in the event of an overcurrent condition through the FETs. The output of the third SR latch U840C is coupled to the base of an NPN bipolar junction transistor Q844 via a resistor R846 (e.g., having a resistance of approximately 18 kΩ). The collector of the transistor Q844 is coupled to the gate of the first FET Q810A via a resistor R848 (e.g., having a resistance of approximately 330 Ω). The drive circuit 830 comprises a similar circuit for coupling the output of the fourth SR latch U840D to the gate of the second FET Q810B.

The overcurrent protection circuit 860 comprises a sense resistor R870 (e.g., having a resistance of approximately 0.015 Ω). The sense resistor R870 is coupled in series between the FETs Q810A, Q810B, and circuit common is referenced to one side of the sense resistor (as shown in FIG. 12), such that the magnitude of the voltage generated across the sense resistor is proportional to the magnitude of the load current $I_{LOAD}$. The sense resistor R870 is coupled to the base of an NPN bipolar junction transistor Q861 via a resistor R862 (e.g., having a resistance of approximately 2.2 kΩ). A resistor R863 is coupled between the base and the emitter of the transistor Q861 and has a resistance of, for example, approximately 4.7 kΩ. The emitter of the transistor Q861 is coupled to circuit common and the collector is coupled to the supply voltage $V_s$ via two resistors R864, R865 (e.g., having resistances of approximately 18 kΩ and 4.7 kΩ, respectively). The junction of the resistors R864, R865 is coupled to the base of a PNP bipolar junction transistor Q866. The emitter of the transistor Q866 is coupled to the supply voltage $V_s$ and the collector is coupled to circuit common through a resistor R867 (e.g., having a resistance of approximately 510 Ω). The collector of the transistor Q866 is coupled to the set input of the third SR latch U840C for rendering the first FET Q810A non-conductive in the event of overcurrent conditions during the positive half cycles. The overcurrent protection circuit 860 comprises a similar circuit (including transistors Q871, Q876, and resistors R872, R873, R874, R875, R877) for rendering the second FET Q810B non-conductive in the event of overcurrent conditions during the negative half cycles.

In the event of an overcurrent condition during a positive half cycle, the overcurrent protection circuit 860 drives the set input of the third SR latch U840C high towards the supply voltage $V_S$. Thus, the transistor Q844 is rendered conductive pulling the gate voltage $V_{G1}$ down towards circuit common and rendering the first FET Q810A non-conductive. The output phototransistor of the second optocoupler U835B is coupled to the reset input of the third SR latch U840C, such that the overcurrent protection is reset during the next half cycle (i.e., the negative half cycle). Specifically, when the output phototransistor of the second optocoupler U835B is rendered conductive during the negative half cycles, the reset input of the third SR latch U840C latch is driven high towards the supply voltage $V_S$, thus rendering the transistor Q844 non-conductive and allowing the first SR latch U840A to control the first FET Q810A. Similarly, the overcurrent protection circuit 860 drives the set input of the fourth SR latch U840D high towards the supply voltage $V_S$, thus rendering the second FET Q810B non-conductive in the event of an overcurrent condition during a negative half cycle. The reset input of the fourth SR latch U840D is driven high when the output phototransistor of the first optocoupler U835A is rendered conductive during the positive half cycles, thus allowing the second SR latch U840B to once again control the second FET Q810B.

Figure 18:
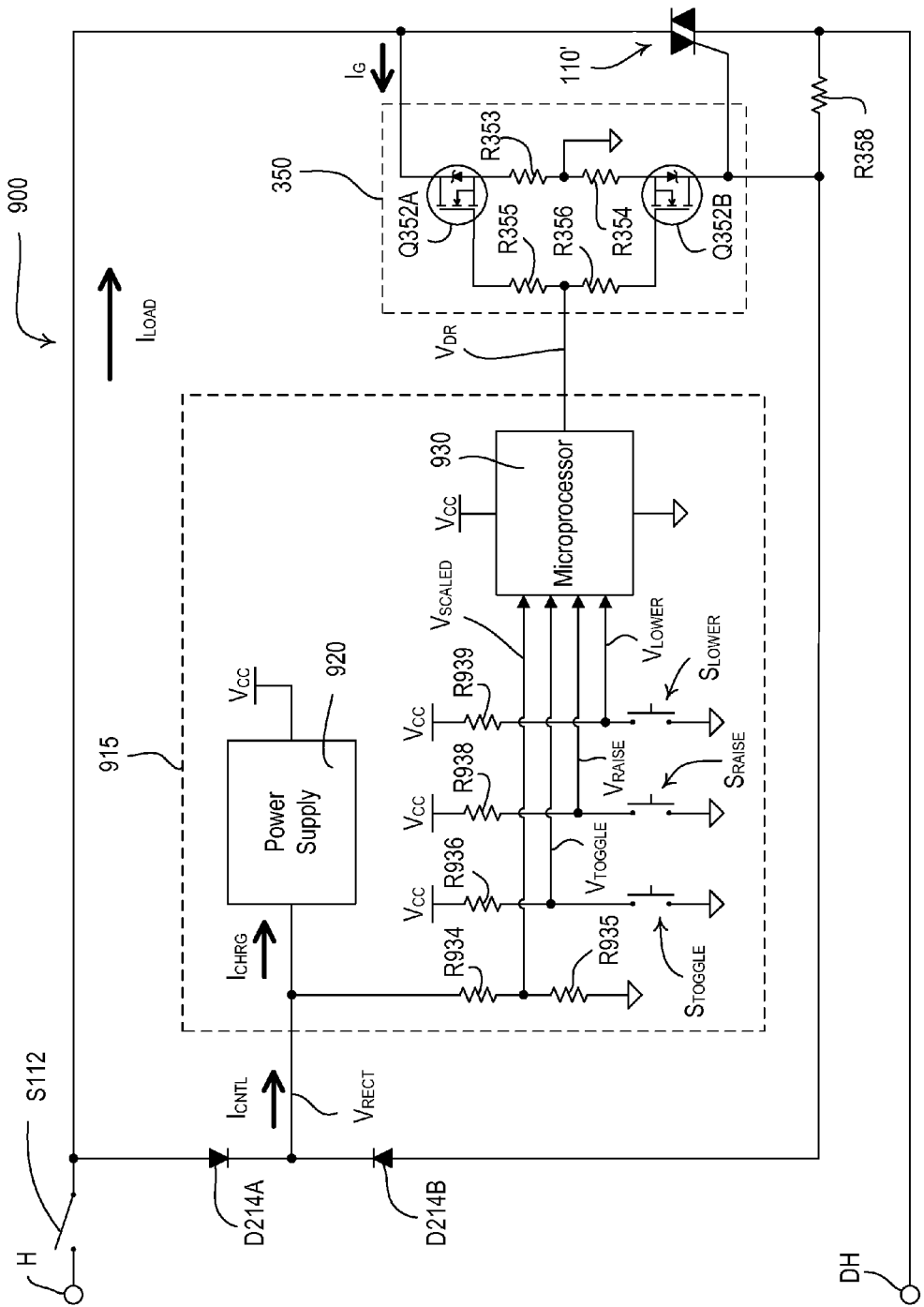
FIG. 18 is a simplified schematic diagram of a dimmer switch having a digital control circuit according to a ninth embodiment of the present invention.

FIG. 18 is a simplified schematic diagram of a dimmer switch 900 according to a ninth embodiment of the present invention. As shown in FIG. 18, the bidirectional semiconductor switch 110 of the dimmer switch 900 of the ninth embodiment is implemented as the triac 110' that is driven by the gate coupling circuit 350 having two anti-series-connected FETs Q352a, Q352B (as in the dimmer switch 300 of the third embodiment). The dimmer switch 900 comprises a digital control circuit 915 having a microprocessor 930 for generating a drive voltage $V_{DR}$ (which is the same as the drive voltage $V_{DR-INV}$ of the third embodiment shown in FIG. 7). Alternatively, the microprocessor 930 may be implemented as a microcontroller, a programmable logic device (PLD), an application specific integrated circuit (ASIC), a field-programmable gate array (FPGA), or any suitable controller or processing device. In addition, the triac 110' of the dimmer switch 900 could alternatively be driven by the opto-coupler U152 of the dimmer switch 100 of the first embodiment. Further, the bidirectional semiconductor switch 110 of the dimmer switch 900 of the ninth embodiment could alternatively be implemented as two FETs in anti-series connection that are simultaneously controlled to be conductive and non-conductive (i.e., in a similar manner as the FETs Q210A, Q210B of the dimmer switch 200 of the second embodiment).

The digital control circuit 915 also comprises a power supply 920 operable to conduct a charging current $I_{CHRG}$ through the LED driver 102 in order to generate a DC supply voltage $V_{CC}$. For example, the power supply 920 may comprise a pass-transistor circuit (as in the dimmer switch 100 of the first embodiment shown in FIG. 4) or any suitable power supply that does not draw a large charging current through the LED driver 102. The digital control circuit 915 comprises a voltage divider having two resistors R934, R935 for generating a scaled voltage $V_{SCALED}$ having a magnitude suitable to be provided to the microprocessor 930. The scaled voltage $V_{SCALED}$ is representative of the voltage developed across the bidirectional semiconductor switch 110. The microprocessor 930 may have an analog-to-digital converter (ADC) for sampling the scaled voltage $V_{SCALED}$, such that the microprocessor 930 is operable to determine the zero-crossings of the phase control voltage $V_{PC}$ in response to the voltage developed across the bidirectional semiconductor switch 110.

The digital control circuit 915 further comprises a toggle tactile switch $S_{TOGGLE}$, a raise tactile switch $S_{RAISE}$, and a lower tactile switch $S_{LOWER}$ for receiving user inputs. The toggle tactile switch $S_{TOGGLE}$ may be mechanically coupled to a toggle actuator or push button. The raise and lower switches $S_{RAISE}$, $S_{LOWER}$ may be mechanically coupled to, for example, separate raise and lower buttons, respectively, or to a rocker switch having an upper portion and a lower portion. The toggle switch $S_{TOGGLE}$ is coupled in series with a resistor R936 between the supply voltage $V_{CC}$ and circuit common, and generates a toggle control signal $V_{TOGGLE}$. The raise switch $S_{RAISE}$ is coupled in series with a resistor R938 between the supply voltage $V_{CC}$ and circuit common, and generates a raise control signal $V_{RAISE}$. The lower switch $S_{LOWER}$ is coupled in series with a resistor R938 between the supply voltage $V_{CC}$ and circuit common, and generates a lower control signal $V_{LOWER}$. The toggle control signal $V_{TOGGLE}$, the raise control signal $V_{RAISE}$, and the lower control signal $V_{LOWER}$ are received by the microprocessor 930. The microprocessor 930 is operable to toggle the LED light source 104 on and off in response to subsequent actuations of the toggle switch $S_{TOGGLE}$. The microprocessor 930 is operable to increase the target intensity $L_{TRGT}$ of the LED light source 104 in response to actuations of the raise switch $S_{RAISE}$ and to decrease the target intensity $L_{TRGT}$ in response to actuations of the lower switch $S_{LOWER}$. Alternatively, the digital control circuit 915 could comprise a potentiometer for generating a DC voltage that is representative of the desired intensity of the LED light source 104 and varies, for example, in magnitude in response to the position of an intensity adjustment actuator of the dimmer switch 900 (i.e., similar to the potentiometer R144 and the intensity adjustment actuator 118 of the dimmer switch 100 of the first embodiment).

In addition, the microprocessor 930 of the dimmer switch 900 may alternatively be operable to receive a digital message from a wired or wireless signal receiver. For example, the digital control circuit 915 of the dimmer switch 900 may comprise a radio-frequency (RF) transceiver (not shown) and an antenna (not shown) for transmitting and receiving RF signals. The microprocessor 930 may be operable to control the bidirectional semiconductor switch 110 in response to the digital messages received via the RF signals. Alternatively, the dimmer switch 900 may simply comprise an RF receiver or an RF transmitter for only receiving or transmitting RF signals, respectively. Examples of RF load control devices and antennas for wall-mounted load control devices are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

Figure 19:
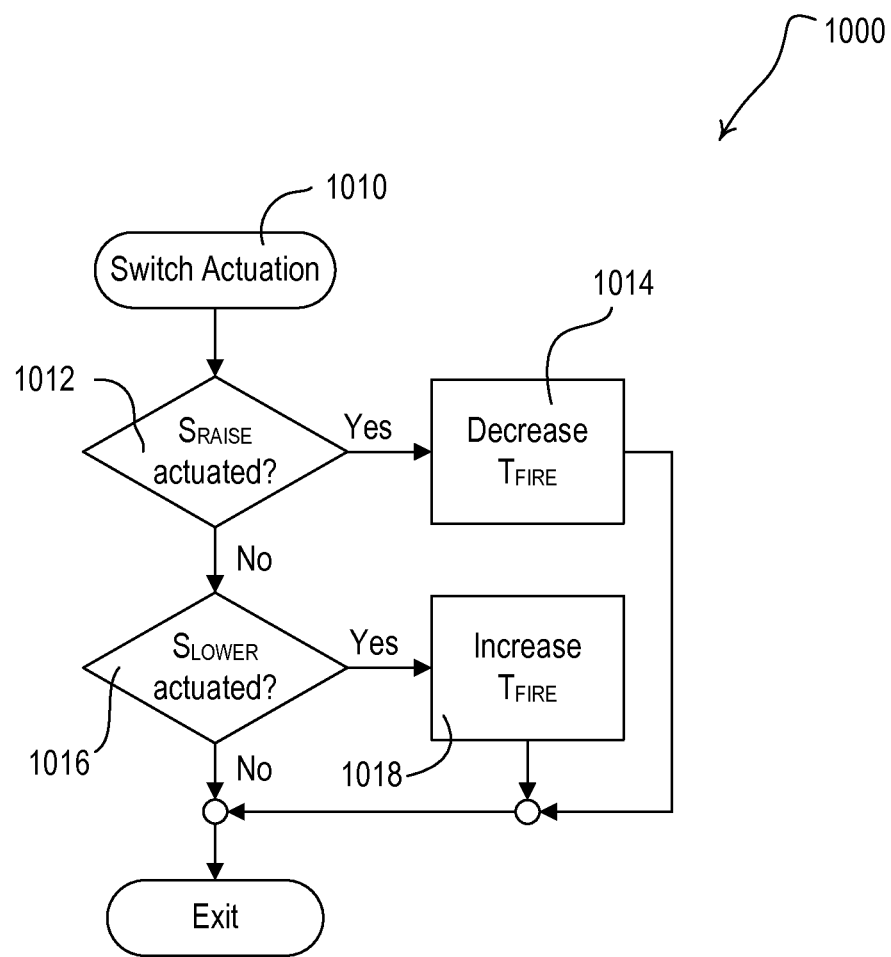
FIG. 19 is a simplified flowchart of a switch procedure executed by a microprocessor of the dimmer switch of FIG. 18 according to the ninth embodiment of the present invention.

FIG. 19 is a simplified flowchart of a switch procedure 1000 executed by the microprocessor 930 in response to an actuation of one of the raise switch $S_{RAISE}$ or the lower switch $S_{LOWER}$ at step 1010 (i.e., if either of the raise control signal $V_{RAISE}$ and the lower control signal $V_{LOWER}$ are pulled down to circuit common). If the raise switch $S_{RAISE}$ is actuated at step 1012, the microprocessor 930 increases the target intensity $L_{TRGT}$ of the LED light source 104 at step 1014 by decreasing a firing time $T_{FIRE}$ (which is approximately equal to the non-conduction time $T_{NC}$ shown in FIGS. 3A and 3B). If the lower switch $S_{LOWER}$ is actuated at step 1016, the microprocessor 930 decreases the target intensity $L_{TRGT}$ of the LED light source 104 by increasing the firing time $T_{FIRE}$ at step 1018, before the button procedure 1000 exits.

Figure 20:
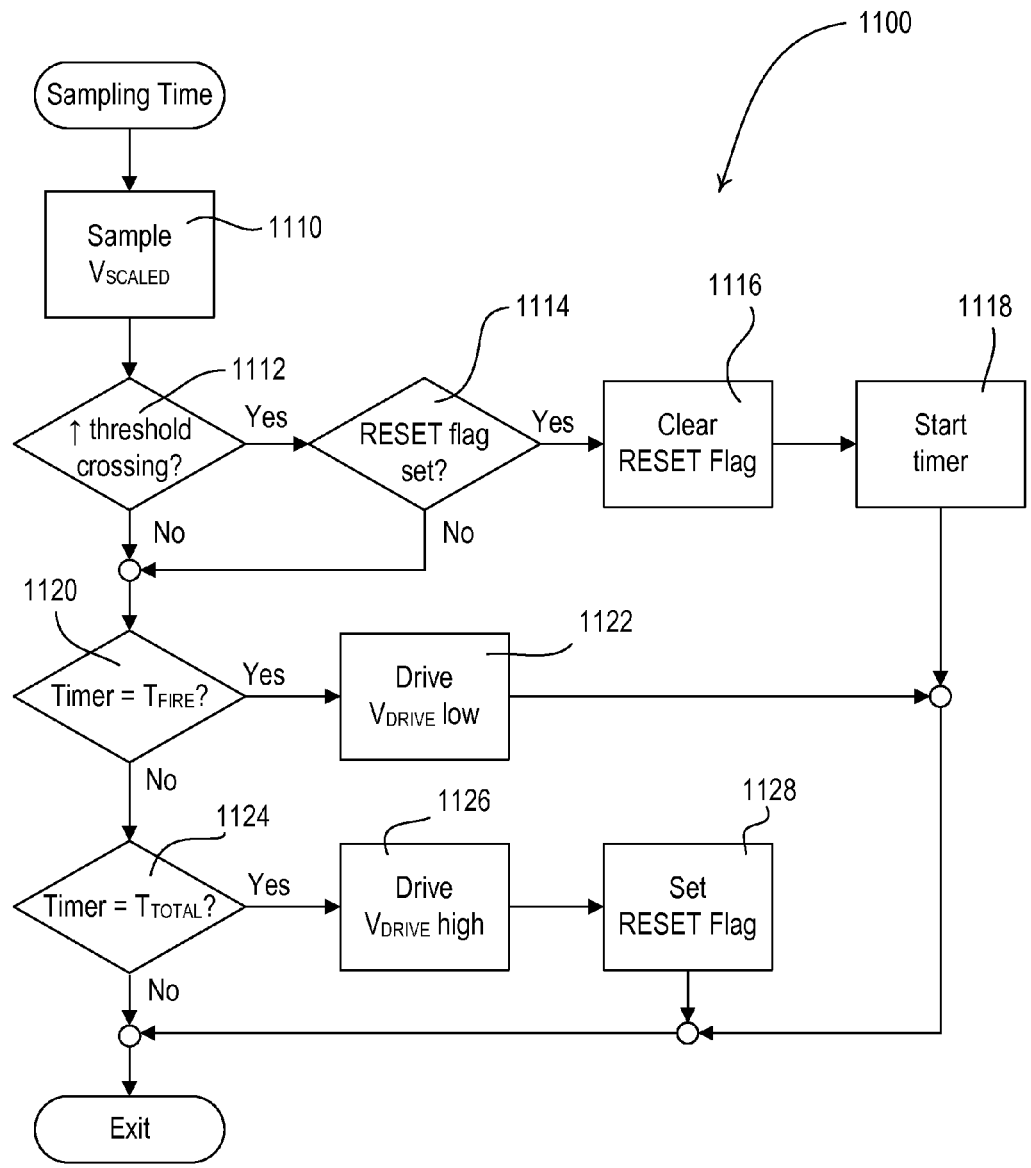
FIG. 20 is a simplified flowchart of a control procedure periodically executed by the microprocessor of the dimmer switch of FIG. 18 according to the ninth embodiment of the present invention.

FIG. 20 is a simplified flowchart of a control procedure 1100 periodically executed by the microprocessor 930 (e.g., every 100 μsec) to sample the scaled voltage $V_{SCALED}$ and generate the drive voltage $V_{DR}$. First, the microprocessor 930 samples the scaled voltage $V_{SCALED}$ using the ADC at step 1110. At step 1112, the microprocessor 930 determines if the scaled voltage $V_{SCALED}$ is increasing in magnitude and if the present sample is greater than the previous sample in order to detect a positive-going transition of the scaled voltage $V_{SCALED}$ across a zero-crossing threshold. If the microprocessor 930 detects a positive-going transition across the zero-crossing threshold at step 1112 and a RESET flag is set at step 1114, the microprocessor 930 clears the RESET flag at step 1116. The microprocessor 930 then initializes a timer to zero and starts the timer increasing in value with respect to time at step 1118, before the control procedure 1100 exits. If the RESET flag is not set at step 1114, the microprocessor 930 does not restart the timer at step 1118.

If the timer is equal to the firing time $T_{FIRE}$ at step 1120, the microprocessor 930 drives the drive voltage $V_{DR}$ low to approximately circuit common to render the bidirectional semiconductor switch 110 conductive at step 1122, and the control procedure 1100 exits. If the time is equal to a total time $T_{TOTAL}$ at step 1124, the microprocessor 930 drives the drive voltage $V_{DR}$ high to approximately the supply voltage $V_{CC}$ to render the bidirectional semiconductor switch 110 non-conductive at step 1126. The total time $T_{TOTAL}$ may be equal to the fixed amount of time $T_{TIM}$ that the timing circuit 130 generates the timing voltage $V_{TIM}$ in the dimmer switch 100 of the first embodiment (i.e., approximately 7.5 msec). At step 1128, the microprocessor 930 sets the RESET flag at step 1128, and the control procedure 1100 exits. The RESET flag allows the microprocessor 930 to ensure that the timer is not restarted until after the total time $T_{TOTAL}$.

While the present invention has been described with reference to the high-efficiency lighting load 101 having the LED driver 102 for controlling the intensity of the LED light source 104, the dimmer switches 100, 200, 300, 400, 500, 600, 700, 800, 900 could be used to control the amount of power delivered to other types of lighting loads (such as incandescent lamps, halogen lamps, magnetic low-voltage lamps, electronic low-voltage lamps), other types of electrical loads (such as motor and fan loads), and other types of load regulation devices (such as electronic dimming ballasts for fluorescent lamps).

This application is related to commonly-assigned U.S. patent application Ser. No. 12/953,057, filed Nov. 23, 2010, entitled TWO-WIRE ANALOG FET-BASED DIMMER SWITCH, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:
1. A load control device for controlling the amount of power delivered from an AC power source to an electrical load, the load control device comprising:
 a thyristor having first and second main load terminals adapted to be coupled in series electrical connection between the AC power source and the electrical load for conducting a load current from the AC power source to the electrical load, the thyristor having a gate for conducting a gate current to render the thyristor conductive;
 a gate coupling circuit coupled between the first main load terminal and the gate of the thyristor, the gate coupling circuit comprising a control input for receiving a drive voltage, the gate coupling circuit operable to conduct the gate current through the gate of the thyristor in response to the drive voltage; and a control circuit coupled to at least one of the main load terminals of the thyristor, the control circuit further coupled to the control input of the gate coupling circuit and operable to generate the drive voltage, the control circuit controls the drive voltage to cause the gate coupling circuit to conduct the gate current to thus render the thyristor conductive at a firing time during a half cycle of the AC power source, the control circuit controls the drive voltage to allow the gate coupling circuit to conduct the gate current at any time from the firing time through approximately the remainder of the half cycle;

wherein the gate coupling circuit conducts approximately no net average current through the control input in order to remain conductive and to be able to conduct the gate current at any time from the firing time through approximately the remainder of the half cycle.

2. The load control device of claim 1, wherein the gate coupling circuit comprises two MOS-gated transistors coupled in anti-series connection between the first main terminal and the gate of thyristor.

3. The load control device of claim 2, wherein the MOS-gated transistors comprise MOSFETs.

4. The load control device of claim 3, wherein the gate coupling circuit comprises two source resistors coupled in series between the sources of the MOSFETs, the junction of the resistors coupled to circuit common.

5. The load control device of claim 4, wherein the source resistors limit the magnitude of the gate current conducted through the gate of the thyristor to render the thyristor conductive.

6. The load control device of claim 5, wherein the gate coupling circuit comprises two gate resistors, each coupled in series with the gate of a respective one of the MOSFETs, the gate resistors coupled together at the control input of the gate coupling circuit for receiving the drive voltage.

7. The load control device of claim 3, wherein the control circuit further comprises a power supply for generating a DC supply voltage across a storage capacitor with respect to a circuit common, the power supply coupled to conduct a charging current through the load when the thyristor is non-conductive in order to generate the DC supply voltage;

wherein the DC supply voltage allows the control circuit to maintain the gate drive voltage at the constant magnitude after the thyristor is rendered conductive, so that the thyristor remains conductive independent of the magnitude of the load current conducted through the thyristor.

8. The load control device of claim 7, further comprising:
a resistor coupled between the second main load terminal and the gate of the of the thyristor; and
a full-wave rectifier bridge for receiving the voltage developed across the gate coupling circuit and generating a rectified voltage that is received by the power supply, the rectifier bridge comprising the body diodes of the MOSFETs of the gate coupling circuit and two additional diodes; p1 wherein the control circuit is coupled to the first main load terminal of the thyristor through one of the diodes of the rectifier bridge.

9. The load control device of claim 3, wherein the control circuit controls the drive voltage to cause the gate coupling circuit to conduct the gate current to render the thyristor conductive at the firing time by driving the magnitude of the drive voltage above approximately a gate threshold voltage of the MOSFETs to render the MOSFETs conductive.

10. The load control device of claim 9, wherein the control circuit controls the drive voltage to allow the gate coupling circuit to conduct the gate current at any time from the firing time through approximately the remainder of the half cycle by maintaining the magnitude of the drive voltage above the gate threshold voltage from the firing time through approximately the remainder of the half cycle.

11. The load control device of claim 3, wherein the control input of the gate coupling circuit conducts an amount of current appropriate to charge input capacitances of the gates of the MOSFETs when the MOSFETs are rendered conductive at the firing time, the amount of current having a small magnitude such that the gate coupling circuit conducts approximately no net average current through the control input.

12. The load control device of claim 3, wherein the thyristor comprises a triac.

13. The load control device of claim 3, wherein the MOS-gated transistors comprise IGBTs.

14. The load control device of claim 1, wherein the control circuit further operable to control the drive voltage to prevent the gate coupling circuit from conducting the gate current and allow the thyristor to become non-conductive at a second time after the firing time and before the end of the half cycle, such that the gate coupling circuit is able to conduct the gate current at any time between the firing time and the second time.

15. The load control device of claim 14, wherein the second time occurs after a fixed amount of time has elapsed since the beginning of the half cycle.

16. The load control device of claim 15, wherein the control circuit varies the firing time in response to the desired amount of power to be delivered to the load to control the amount of power delivered to the load to the desired amount, and controls the fixed amount of time to be approximately equal during each half cycle of the AC power source.

17. The load control device of claim 16, wherein the control circuit comprises:
a timing circuit for generating a timing signal that increases in magnitude with respect to time, the timing circuit starting to generate the timing signal at the half cycle start time; and
a drive circuit for receiving the timing voltage and rendering the thyristor conductive each half cycle in response to the magnitude of the timing signal, so as to control the amount of power delivered to the electrical load to a desired amount;
wherein the timing circuit is operable to continue generating the timing signal after the thyristor is rendered conductive at the firing time, such that the gate coupling circuit continues to render the thyristor conductive and the thyristor remains conductive independent of the magnitude of the load current conducted through the thyristor.

18. The load control device of claim 16, wherein the control circuit comprises a microprocessor.

19. The load control device of claim 14, wherein the second time occurs near the end of the half cycle.

20. The load control device of claim 1, wherein the gate coupling circuit comprises a voltage-controlled controllably conductive device operable to be rendered conductive at the firing time in response to the drive voltage and to remain conductive for the remainder of the half cycle, to thus be able to conduct the gate current at any time from the firing time through the remainder of the half cycle.

21. The load control device of claim 1, wherein the gate coupling circuit conducts an average current of less than one microamp through the control input in order to be able to conduct the gate current at any time from the firing time through the remainder of the half cycle.

22. The load control device of claim 1, wherein the control circuit is coupled to the at least one main load terminal of the thyristor through a diode.

23. The load control device of claim 1, wherein the control circuit is coupled to the at least one main load terminal of the thyristor through a resistor.

24. A load control circuit for controlling the amount of power delivered from an AC power source to an electrical load to a desired amount of power, the load control circuit comprising:
- a thyristor having first and second main load terminals adapted to be coupled in series electrical connection between the AC power source and the electrical load for conducting a load current from the AC power source to the electrical load, the thyristor having a gate for conducting a gate current to render the thyristor conductive; and
- a gate coupling circuit comprising a control input for receiving a drive voltage, the gate coupling circuit further comprising two MOS-gated transistors coupled in anti-series connection between the first main load terminal and the gate of thyristor, each of the two MOS-gated transistors rendered conductive when a voltage at a gate of the MOS-gated transistor exceeds a gate threshold voltage, the MOS-gated transistors rendered conductive to conduct the gate current through the gate of the thyristor when the magnitude of the drive voltage is driven above the gate threshold voltage at a firing time during a half cycle of the AC power source, and to continue to conduct the gate current while the magnitude of the drive voltage is maintained above the gate threshold voltage for approximately the remainder of the half cycle;

wherein the gate coupling circuit conducts approximately no net average current through the control input in order to maintain the MOS-gated transistors conductive and to be able to conduct the gate current at any time while the magnitude of the drive voltage is maintained above approximately the gate threshold voltage.

25. The load control circuit of claim 24, wherein the MOS-gated transistors comprise MOSFETs.

26. The load control circuit of claim 25, wherein the gate coupling circuit comprises two source resistors coupled in series between the sources of the MOSFETs, the junction of the resistors coupled to circuit common, the source resistors limiting the magnitude of the gate current conducted through the gate of the thyristor to render the thyristor conductive.

27. The load control circuit of claim 25, wherein the gate coupling circuit comprises two gate resistors, each coupled in series with the gate of a respective one of the MOSFETs, the gate resistors coupled together at the control input of the gate coupling circuit for receiving the drive voltage.

28. The load control circuit of claim 24, wherein the control input of the gate coupling circuit conducts an amount of current appropriate to charge input capacitances of the gates of the MOS-gated transistors when the transistors are rendered conductive at the firing time.

29. The load control circuit of claim 24, wherein the control input of the gate coupling circuit conducts an average current of less than one microamp in order to maintain the MOS-gated transistors conductive to be able to conduct the gate current at any time from the firing time through the remainder of the half cycle.

30. The load control circuit of claim 24, wherein the thyristor comprises a triac.

31. The load control circuit of claim 24, wherein the MOS-gated transistors comprise IGBTs.

32. A load control device for controlling the amount of power delivered from an AC power source to an electrical load, the load control device comprising:
- a thyristor having first and second main load terminals adapted to be coupled in series electrical connection between the AC power source and the electrical load for conducting a load current from the AC power source to the electrical load, the thyristor having a gate for conducting a gate current to render the thyristor conductive;
- a gate coupling circuit comprising a control input for receiving a constant gate drive voltage, the gate coupling circuit further comprising two MOS-gated transistors coupled in anti-series connection between the first main load terminal and the gate of thyristor, the MOS-gated transistors rendered conductive to conduct the gate current through the gate of the thyristor in response to the drive voltage; and
- a control circuit coupled to at least one of the main load terminals of the thyristor, the control circuit further coupled to the control input of the gate coupling circuit and operable to generate the drive voltage to cause the MOS-gated transistors to conduct the gate current to render the thyristor conductive at a firing time during a half cycle of the AC power source and to prevent the MOS-gated transistors from conducting the gate current and allow the thyristor to become non-conductive at a second time after the firing time and before the end of the half cycle, such that the MOS-gated transistors are able to conduct the gate current and the thyristor is rendered conductive at any time between the firing time and the second time;

wherein the gate coupling circuit conducts an average current of less than one microamp through the control input in order to maintain the MOS-gated transistors conductive, such that the MOS-gated transistors are able to conduct the gate current at any time between the firing time and the second time.

* * * * *